United States Patent [19]
Iizuka

[11] Patent Number: 5,691,835
[45] Date of Patent: Nov. 25, 1997

[54] SCANNING LENS

[75] Inventor: Takashi Iizuka, Tokyo, Japan

[73] Assignee: Asahi Kogaku Kogyo Kabushiki Kaisha, Tokyo, Japan

[21] Appl. No.: 572,798

[22] Filed: Dec. 13, 1995

[30] Foreign Application Priority Data

Dec. 16, 1994 [JP] Japan ................................ 6-334362
Apr. 14, 1995 [JP] Japan ................................ 7-113595

[51] Int. Cl.$^6$ .......................... G02B 26/08; G02B 9/58
[52] U.S. Cl. ...................... 359/206; 359/207; 359/662; 359/715; 359/782
[58] Field of Search ................... 359/205–207, 359/662, 668, 754, 771, 781, 782, 216–219, 715, 710, 711

[56] References Cited

U.S. PATENT DOCUMENTS 4,527,858  7/1985  Takahashi et al. .

FOREIGN PATENT DOCUMENTS 59-170810  9/1984  Japan ................................ 359/782
5-53076    3/1995  Japan .

OTHER PUBLICATIONS

English Language Translation of JP 5-53076.

Primary Examiner—James Phan
Attorney, Agent, or Firm—Greenblum & Bernstein P.L.C.

[57] ABSTRACT

An fθ scanning lens arrangement, arranged from a polygonal mirror side to an imaging surface side, including a first, second, third, and fourth lens with having negative, positive, positive, and negative power, respectively, in the main scanning and subscanning directions is provided. The ratio of the focal length in the main scanning direction of the fourth lens versus the focal length in the main scanning direction of the entire fθ lens is selected to simultaneously minimize astigmatism, field curvature, and linearity error. Further, the ratio of the focal length in a subscanning direction of the first lens versus the focal length in the subscanning direction of the second lens is selected to minimize curving of scanning lines displaced from the optical axis.

37 Claims, 22 Drawing Sheets

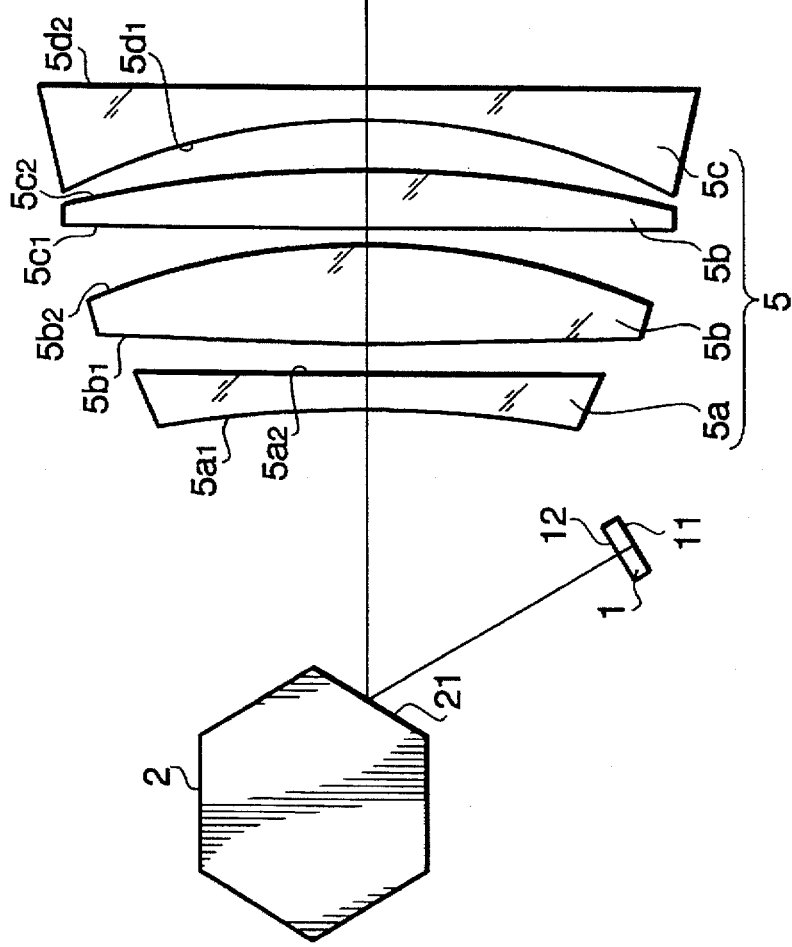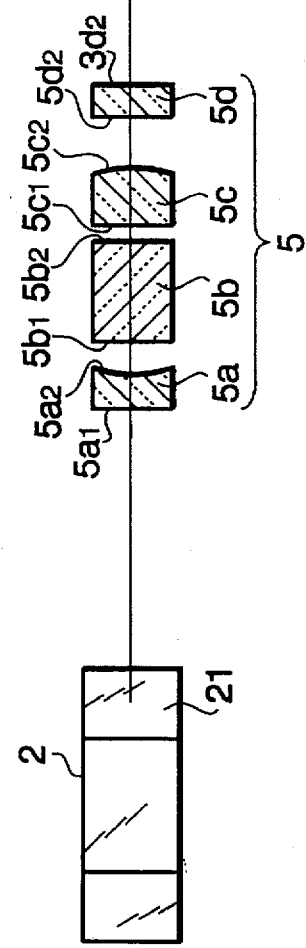

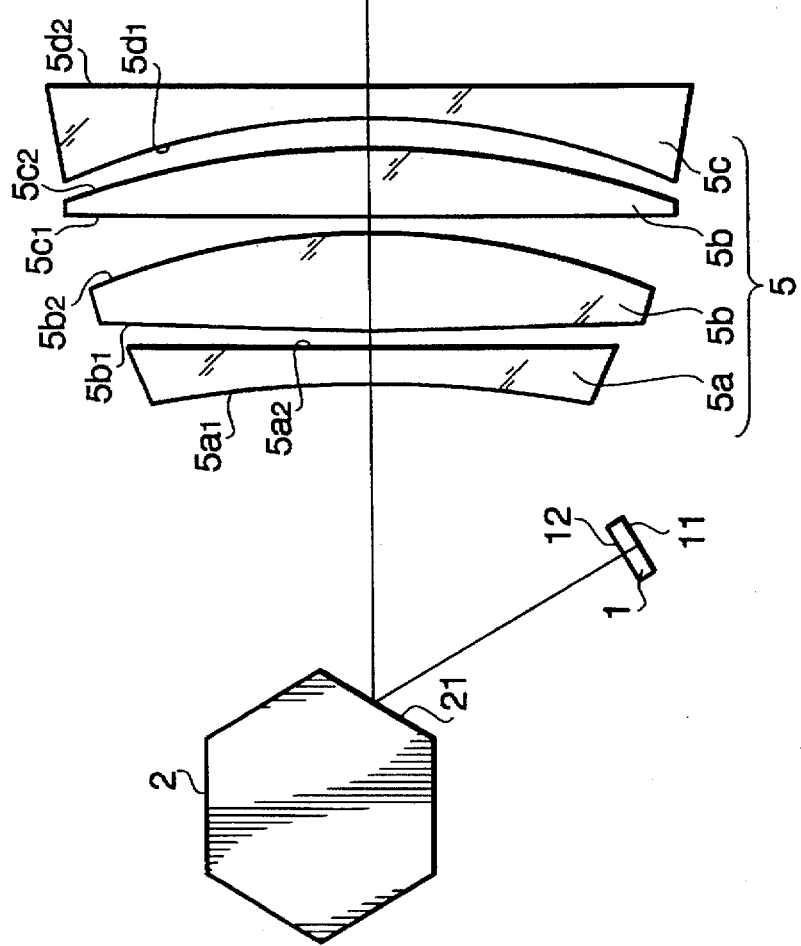
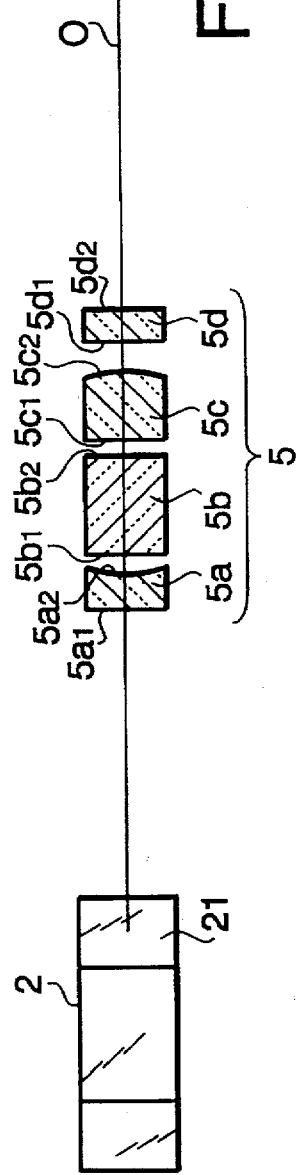

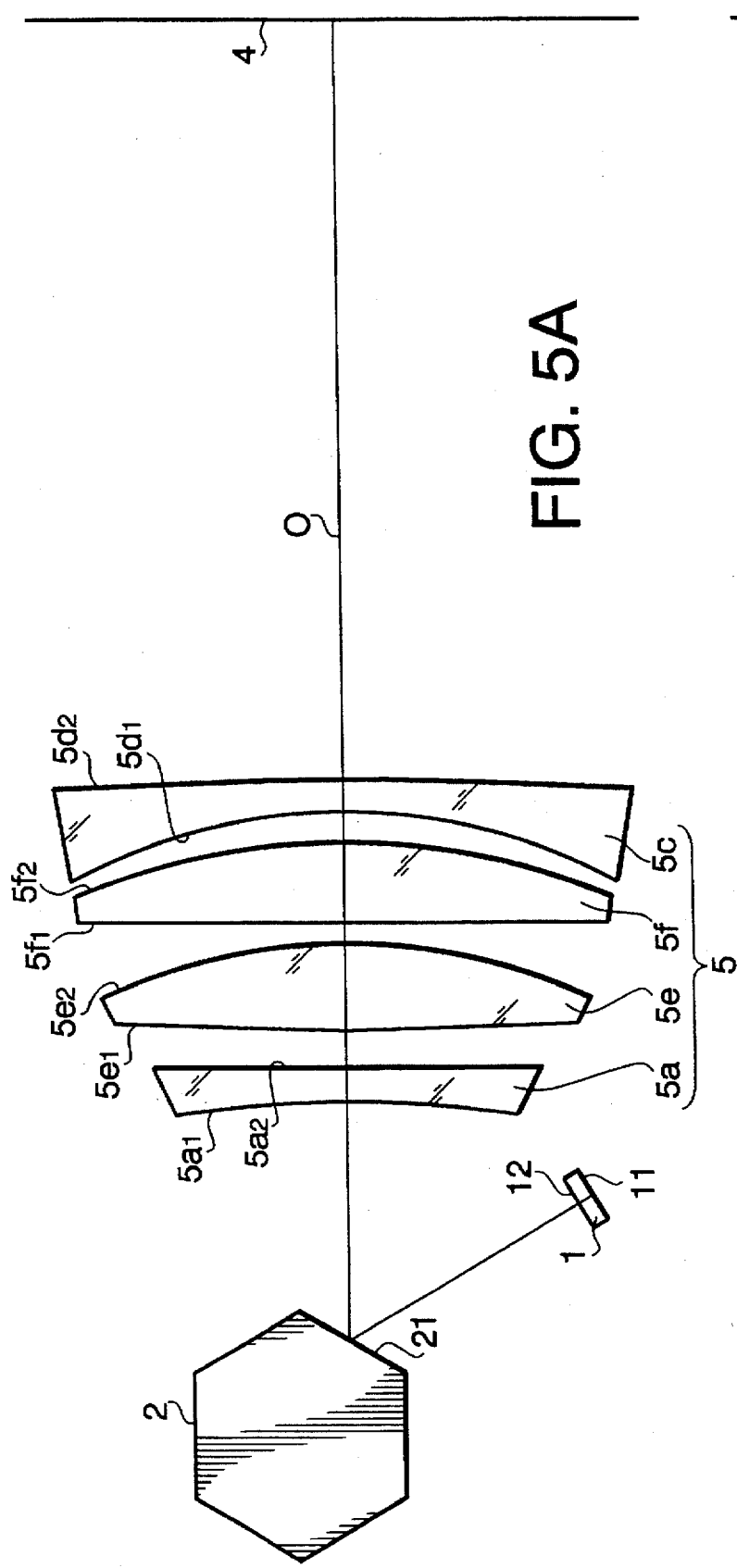
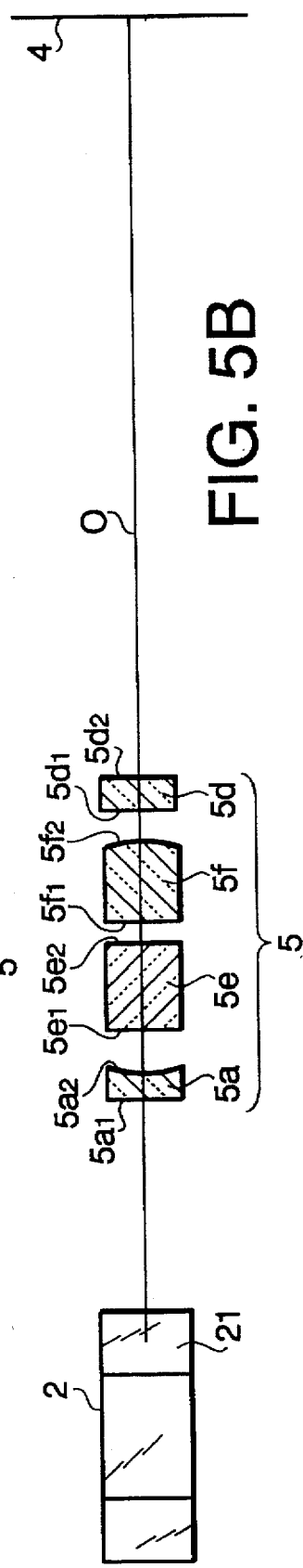

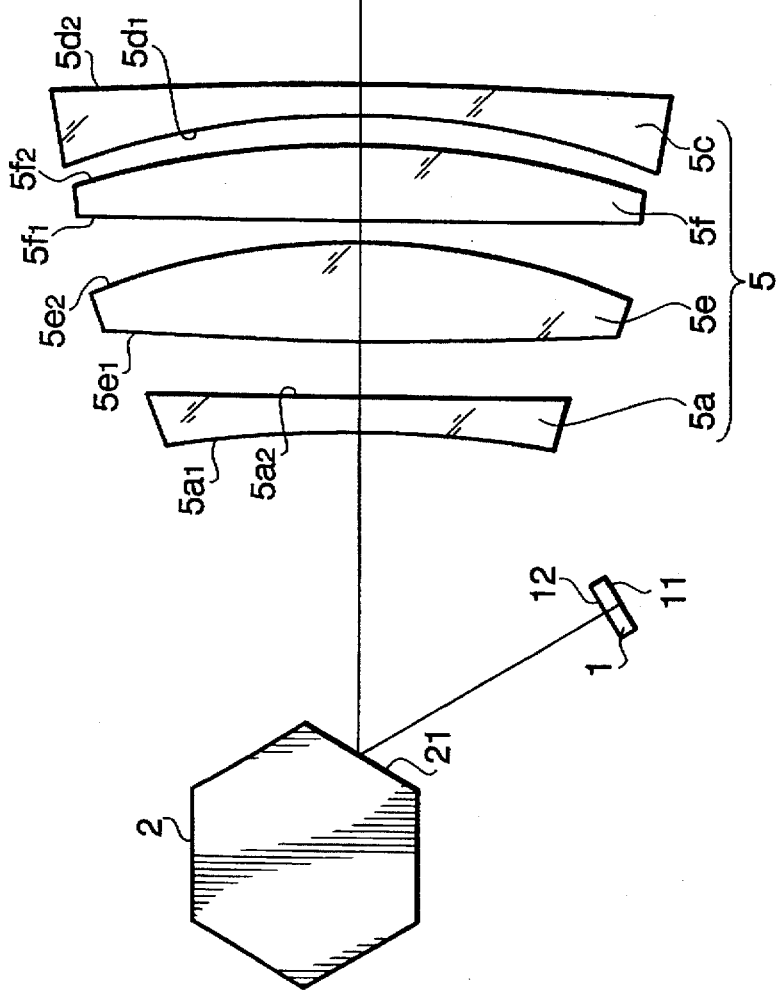
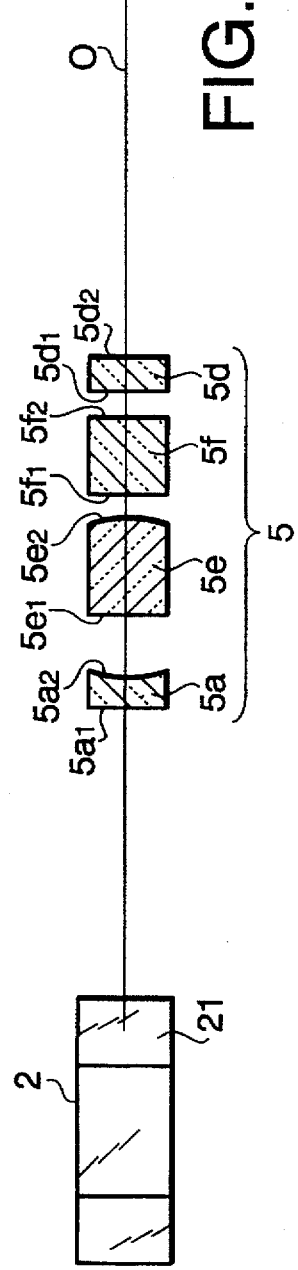
FIG. 8A
FIG. 8B

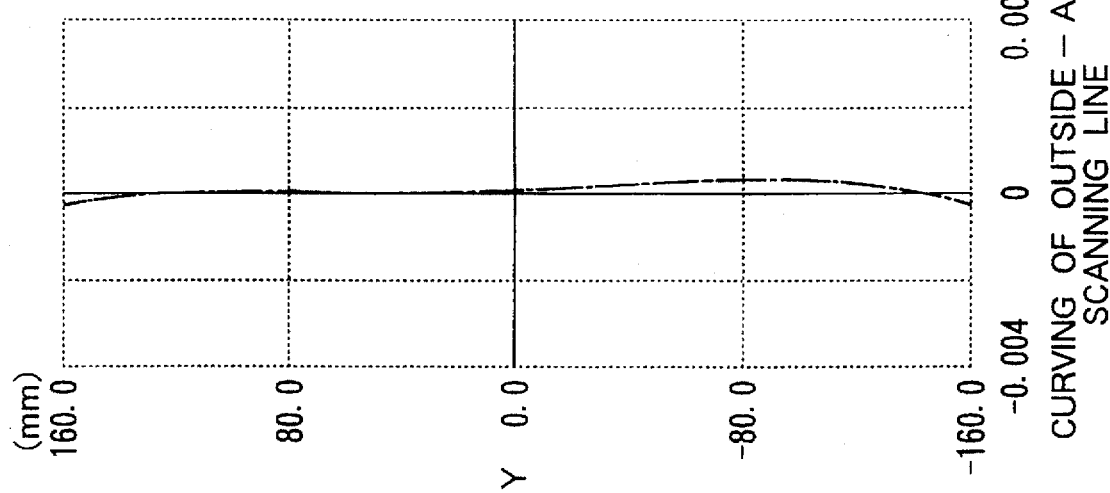
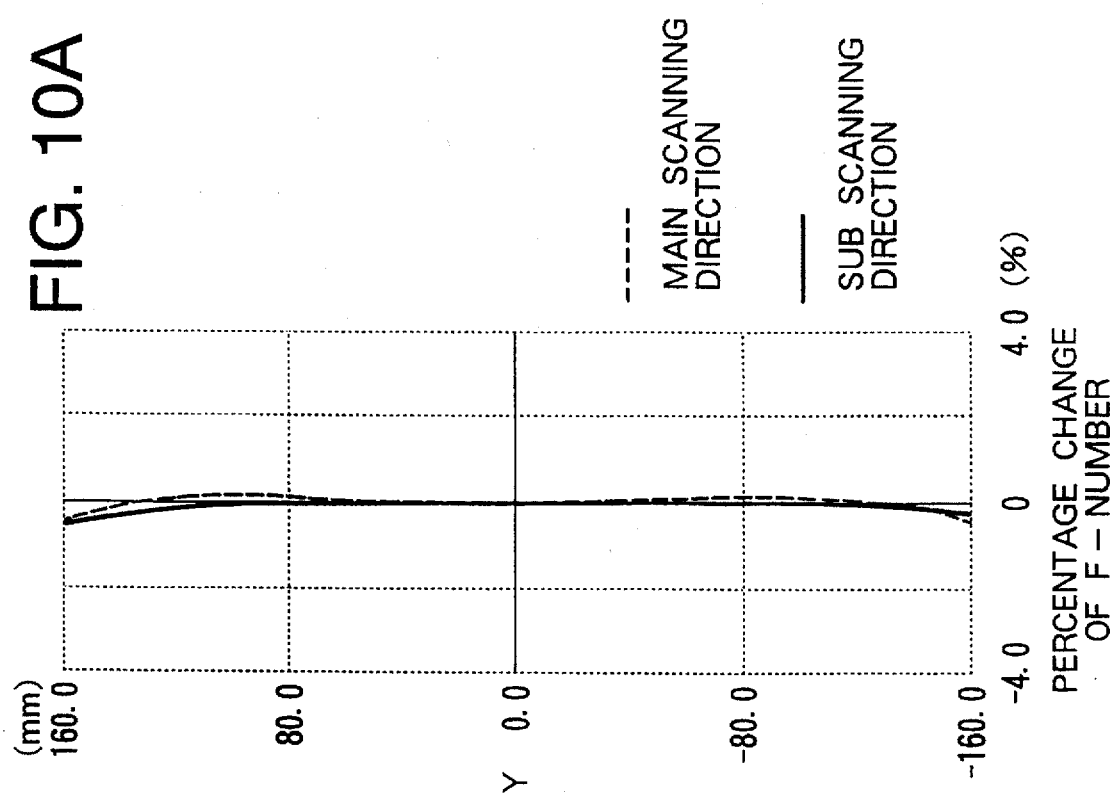

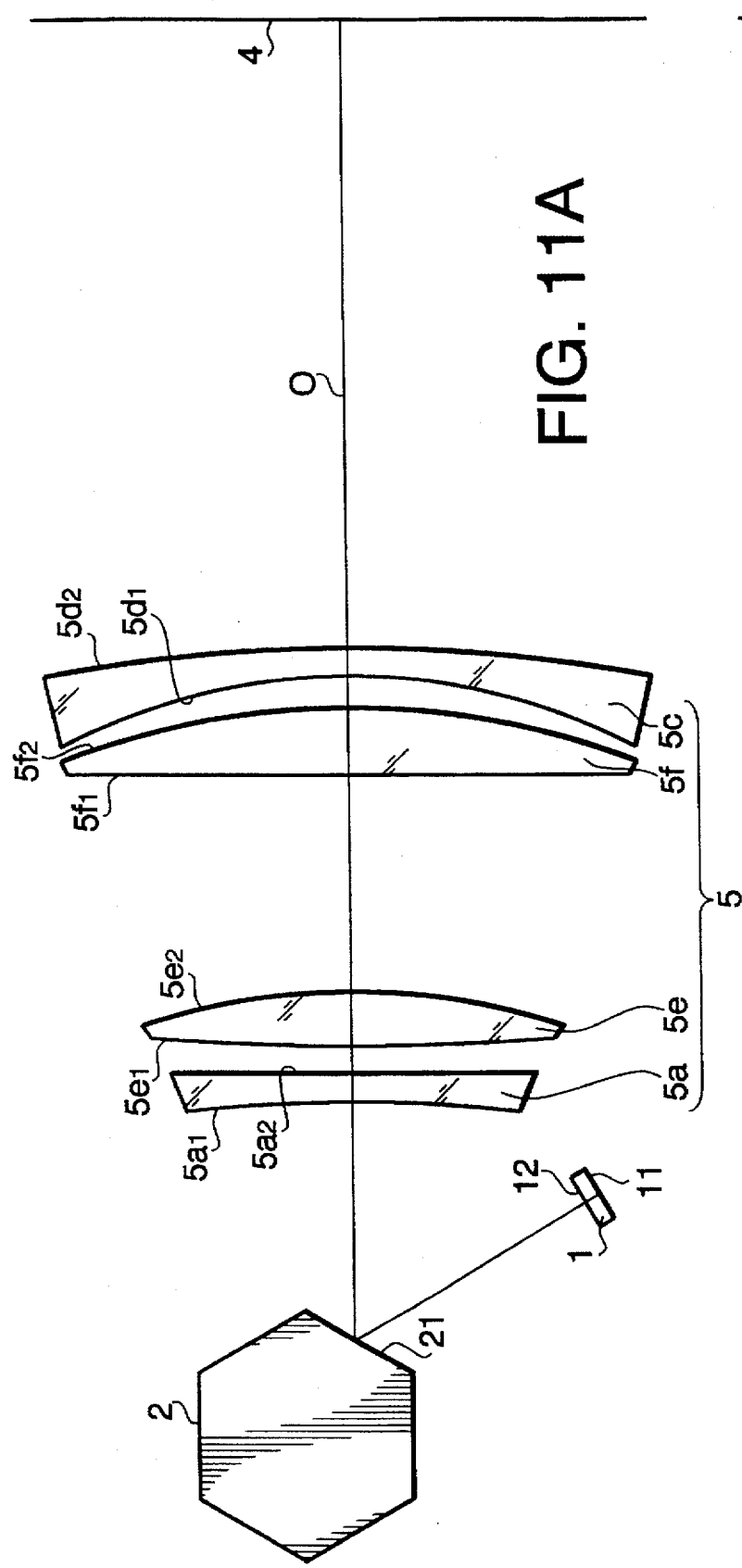
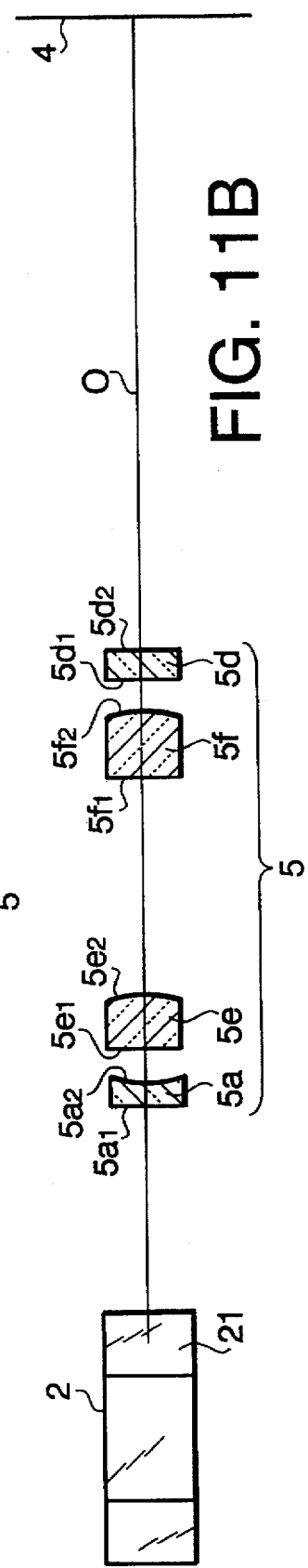
FIG. 11A
FIG. 11B

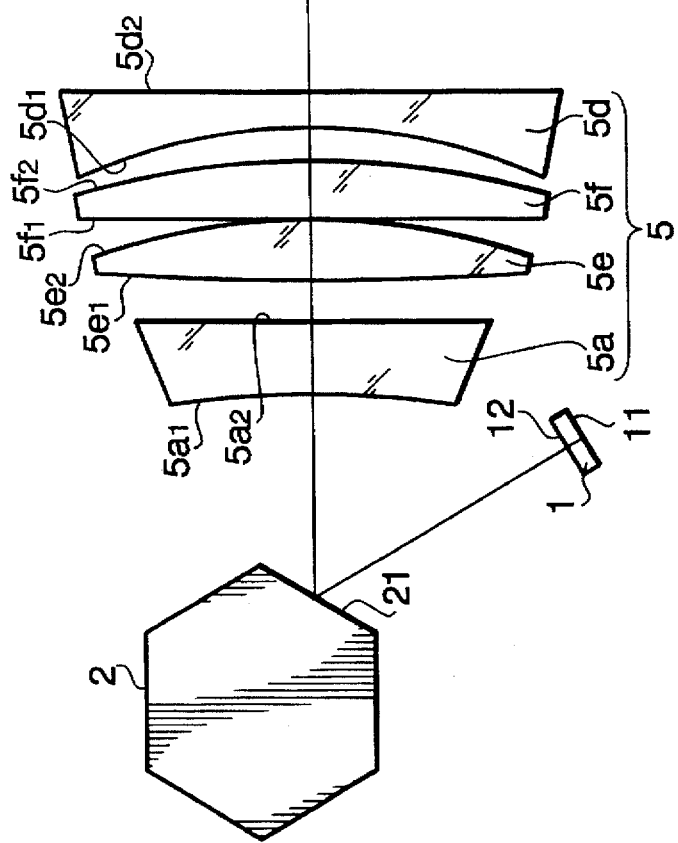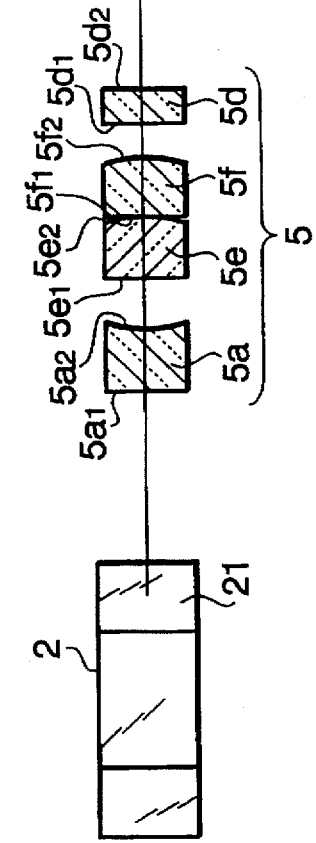

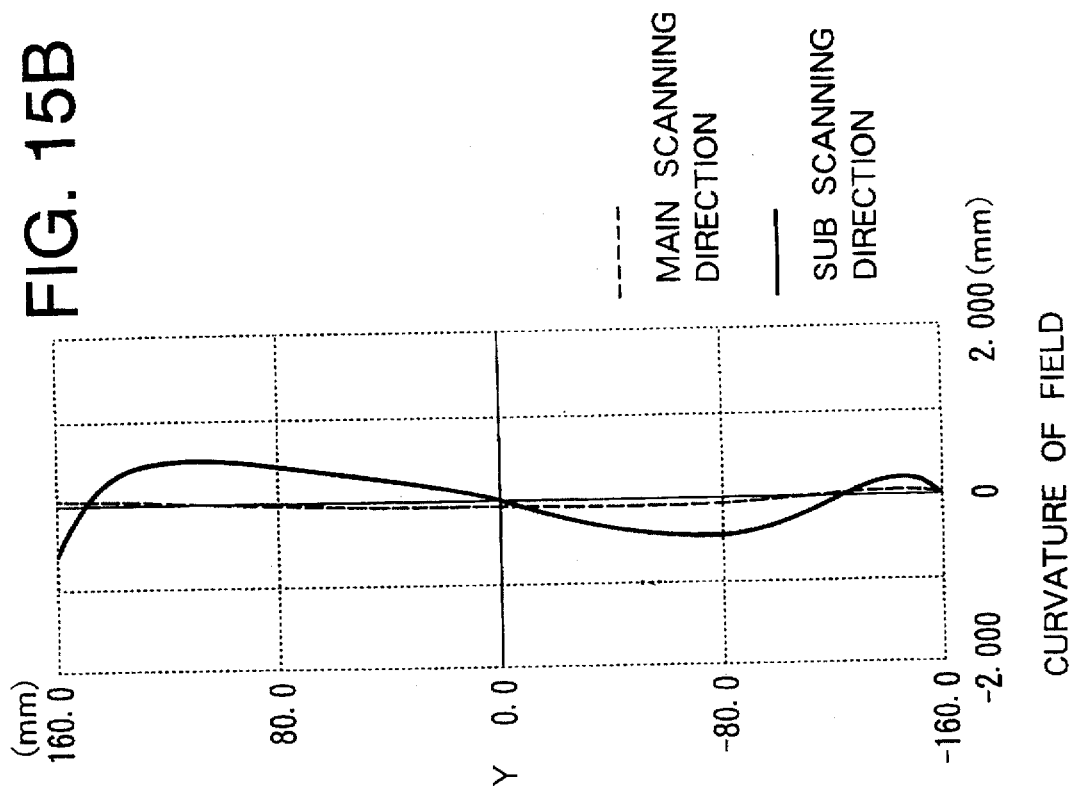
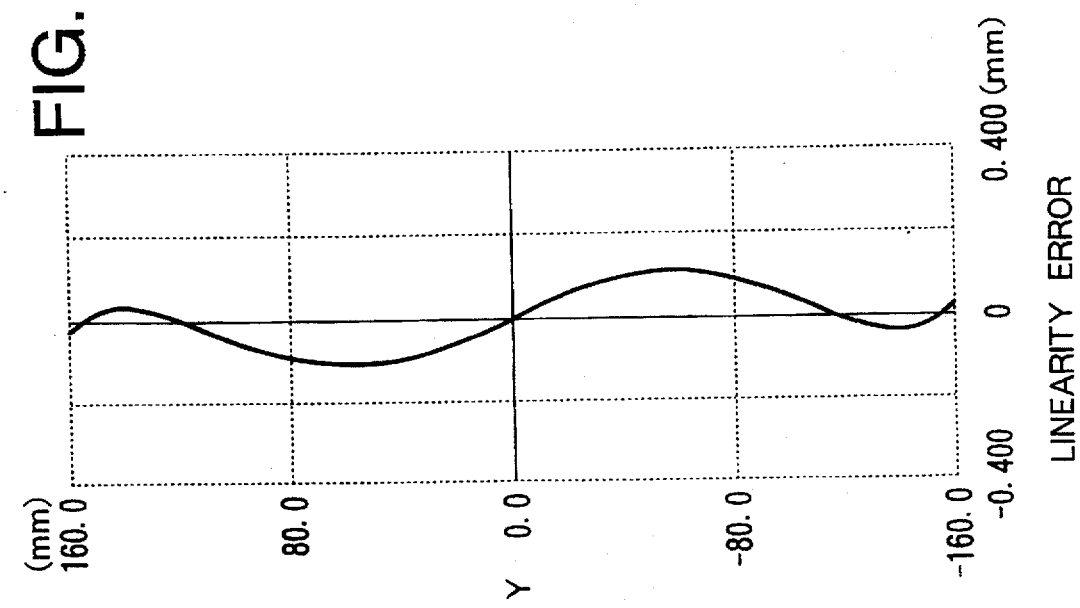

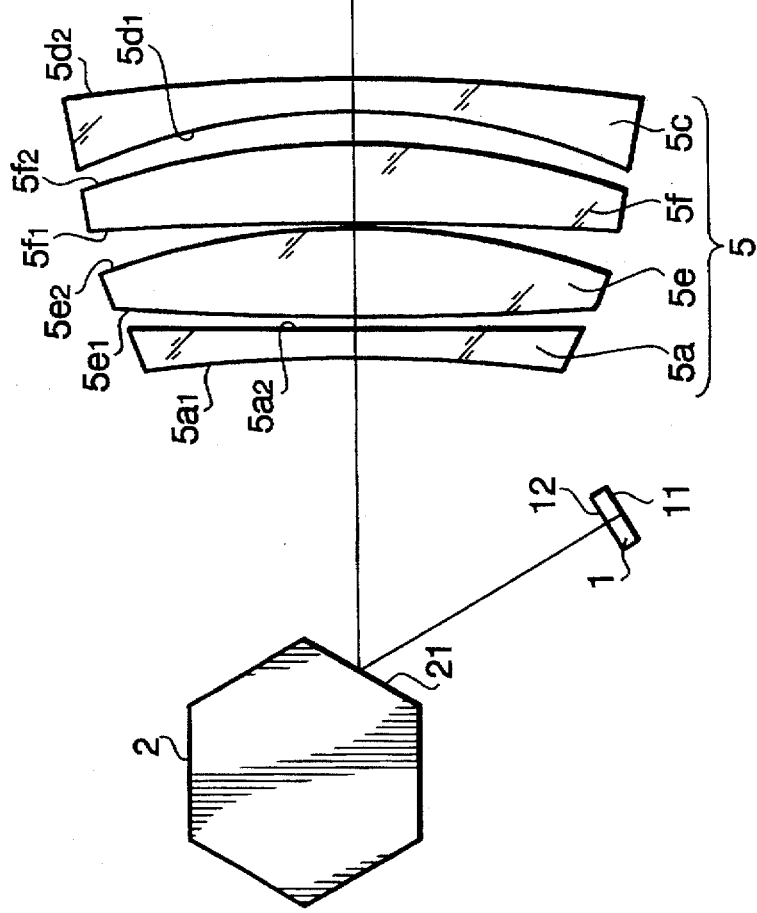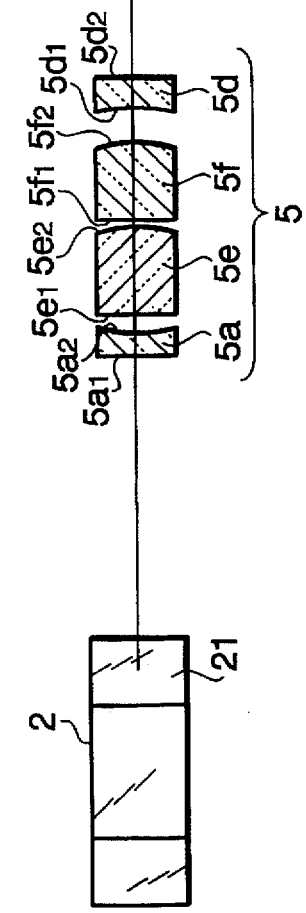

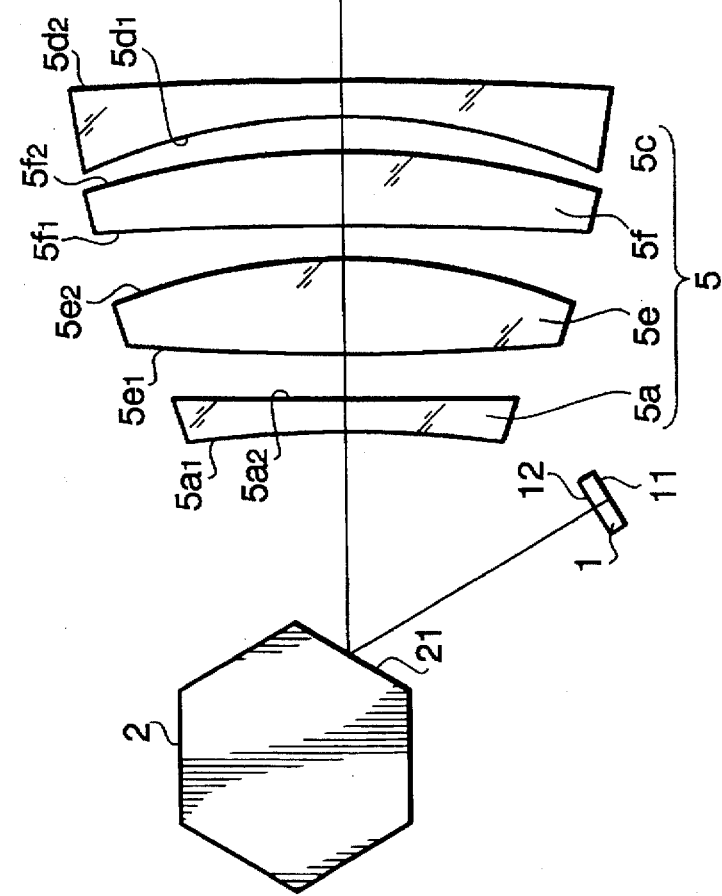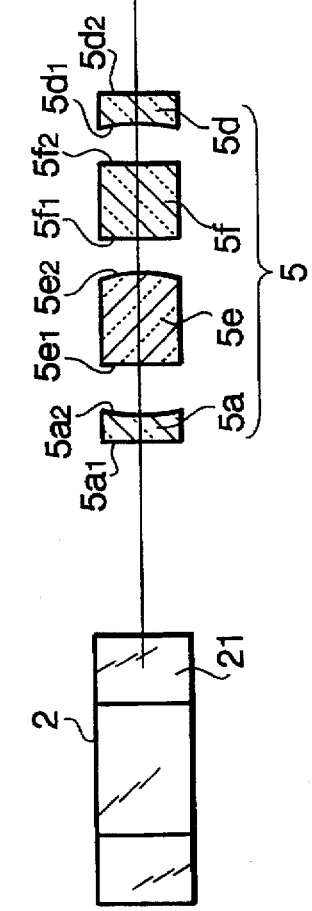

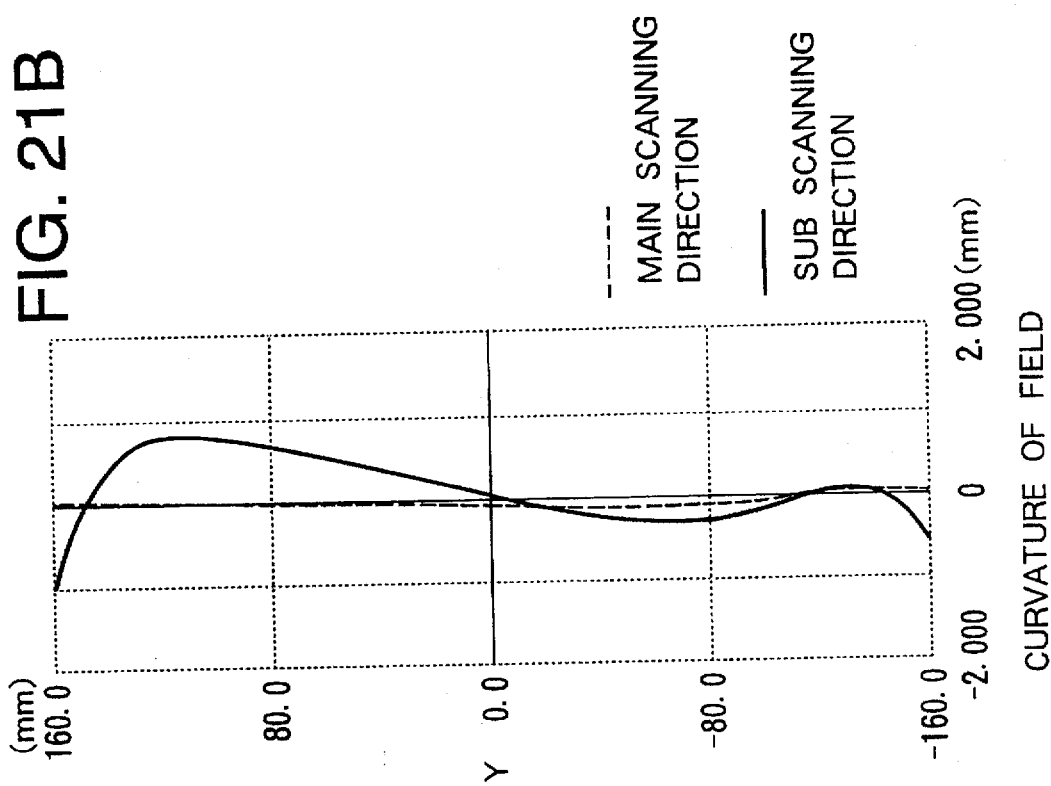
FIG. 21A
FIG. 21B
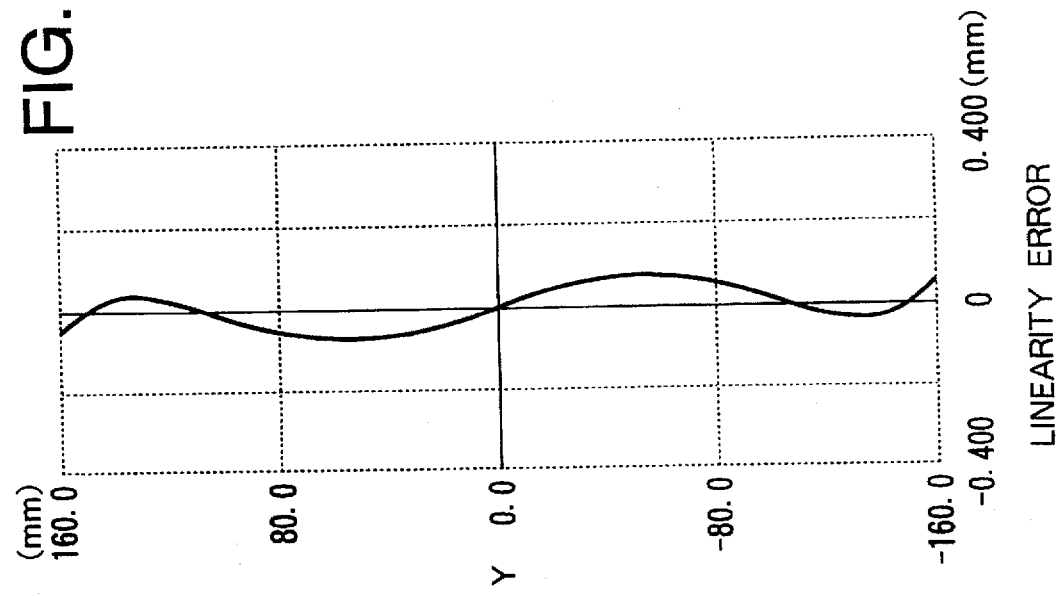

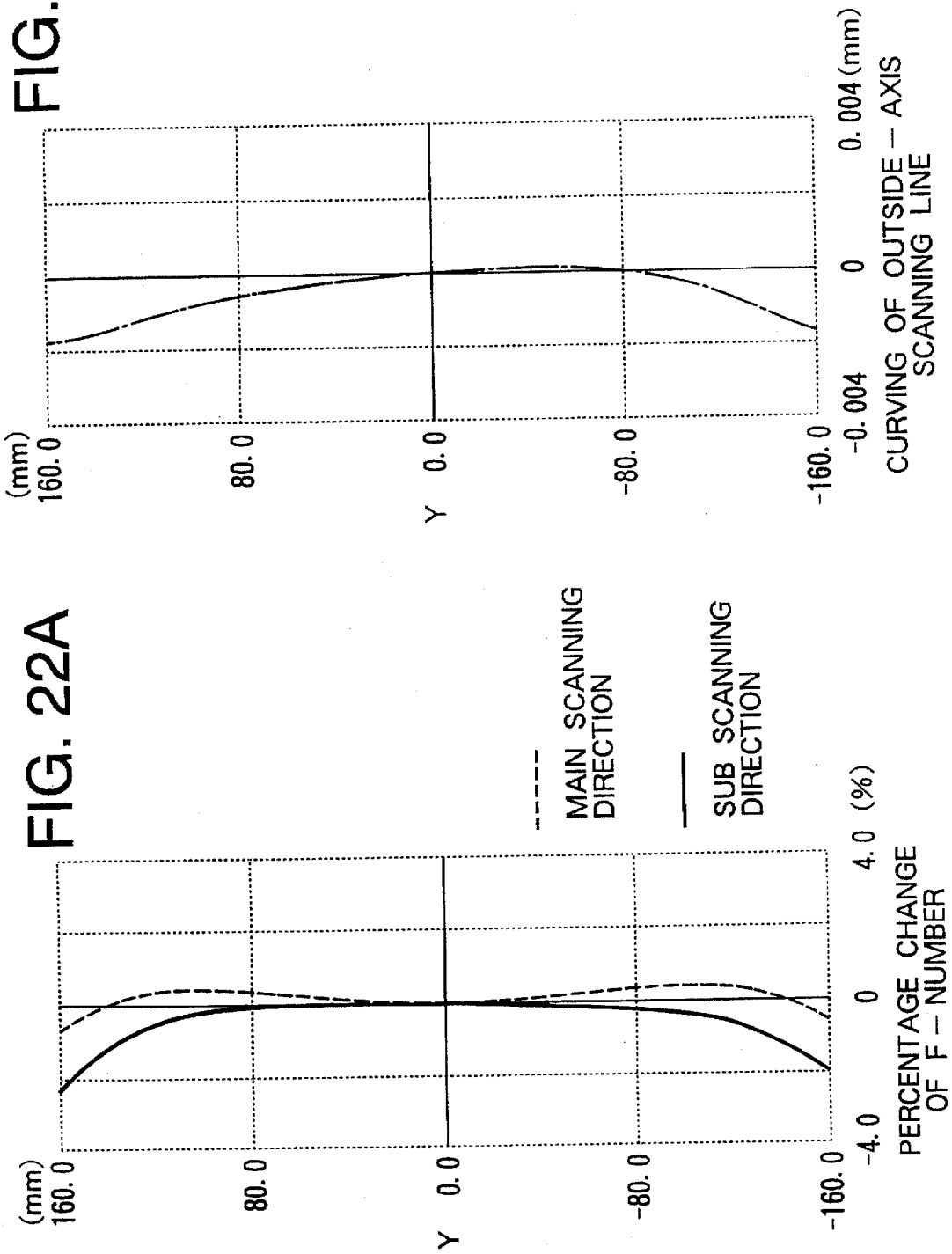

ND LENS

BACKGROUND OF THE INVENTION

The present invention relates to a scanning lens used in the scanning optical system of a laser printer, fax machine, and like devices, and more particularly, concerns a scanning lens enabling high-definition imaging.

Recently, increased requirements for image density (commonly measured in "dpi", or dots per inch) and imaging speed have exceeded the capabilities of conventional scanning lens systems. Particularly, in order to increase image density, good field curvature in both main and subscanning directions is necessary. However, the field curvature in the subscanning direction using known system is large, and it has proven difficult to balance the various lens aberrations with the conventional arrangements.

In order to improve only the image density of a scanning optical system, the spot diameter must be made small. The spot diameter could conceivably be reduced by increasing the numerical aperture (NA) of the scanning lens. However, at the same time, increasing the numerical aperture decreases the focal depth. Thus, if the numerical aperture is increased, the curvature of field must be very low in both the scanning directions so that the spot does not deviate away from the focal depth range.

However, in conventional systems, the curvature of field in the subscanning direction is high, and it is very difficult to simultaneously produce both a very low curvature of field in the subscanning direction, and a very low curvature of field in the main scanning direction. Particularly, image curvature in the subscanning direction is difficult to suppress in conventional systems. Furthermore, in conventional systems, it is difficult to simultaneously correct both linearity errors and field curvature. Because of these considerations, improving the image density (i.e., dpi or dots per inch) in the conventional scanning lens is very difficult.

Furthermore, the percentage change of the f-number in relation to the image height also affects the size of the spot formed. In order to minimize the change in size of the spot for the entire length of the scanning line, the percentage change of the f-number must be minimized in both scanning directions.

Lastly, with the conventional scanning lens, the curvature in the subscanning direction of a scanning line displaced from the optical axis is high. Thus, if such a conventional scanning lens is applied to a multi-beam scanning optical system, using a plurality of scanning lines separated in the subscanning direction, precise imaging is prevented as the scanning lines displaced from the optical axis curve away in the subscanning direction.

SUMMARY OF THE INVENTION

It is therefore an object of the present invention to provide an improved scanning lens with low astigmatism, and improved field curvature in both the main and subscanning directions.

It is another object of the invention to provide an improved scanning lens with both low field curvature, particularly in the subscanning direction, and low linearity error.

It is still another object of the invention to provide an improved scanning lens that satisfies the previously stated objects, and further corrects curving of scanning lines displaced from the optical axis.

It is a further object of the invention to provide an improved scanning lens that satisfies the previously stated objects, and further has a low percentage change in f-number in relation to image height in both main scanning and subscanning directions.

In order to meet the objects of the present invention, according to one aspect of the present invention, a scanning lens for imaging light beams deflected by a deflector onto a scanned surface, includes, in order from the deflector toward the scanned surface, a first lens having negative power in at least a main scanning direction; a second lens having positive power in at least the main scanning direction; a third lens having positive power in at least the main scanning direction; and a fourth lens having negative power in at least the main scanning direction.

The use of a four-element scanning lens, in the noted order, allows astigmatism and field curvature in both the main scanning and subscanning directions to be corrected.

Preferably, the first lens has negative power in a subscanning direction, the second lens has positive power in the subscanning direction, the third lens has positive power in the subscanning direction, and the fourth lens has negative power in the subscanning direction. Further preferably, the first lens has a cylindrical surface on the scanned surface side having negative power in the subscanning direction.

In one preferred embodiment, a scanned surface side of the third lens may be a positive toric surface generated about an axis of rotation in the subscanning direction, and having a positive power in the subscanning direction higher than that in the main scanning direction.

In a particular case, the second lens is a biconvex lens with both convex surfaces thereof being spherical, the third lens is a plano-convex toric lens with the deflector side surface thereof being a planar surface, and the fourth lens is a rotationally symmetric lens with the deflector side surface thereof providing the negative power. This arrangement allows the final correction of field curvature in both main scanning and subscanning directions, while keeping linearity error corrected.

In a particularly favorable development of the invention, the scanning lens satisfies the condition $-4.0<f4/f<-0.8$, wherein f4 is a focal length of the main scanning direction of the fourth lens, and f is a focal length of the main scanning direction of the scanning lens. Consequently, by satisfying the condition $-4.0<f4/f<-0.8$, the curvature of field in the subscanning direction is kept low, while linearity error (fθ characteristic) is satisfactorily corrected. Furthermore, the low linearity error is achieved at the same time as a low field curvature in both the main scanning and subscanning directions.

In another preferred embodiment, a scanned surface side of the second lens is a positive toric surface generated about an axis of rotation in the subscanning direction, and having a positive power in the subscanning direction higher than that in the main scanning direction.

In a particular case, the third lens is a plano-convex lens having a deflector side surface formed as a planar surface and having a scanned surface side formed as a spherical surface, and the fourth lens is a rotationally symmetric lens having negative power provided by the deflector side surface. This arrangement also allows the final correction of field curvature in both main scanning and subscanning directions, while keeping linearity error corrected. Furthermore, it allows the correction of curving of scanning lines displaced from the optical axis, and the correction of deviation of f-number as image height increases.

In another preferred embodiment, a deflector side surface of the second lens is a spherical surface that is convex on the deflector side.

In one particularly favorable development of the invention, the scanning lens satisfies the condition $-2.0<f4/f<-0.8$, wherein f4 is a focal length of the main scanning direction of the fourth lens and f is a focal length of the main scanning direction of the scanning lens. Consequently, by satisfying the condition $-2.0<f4/f<-0.8$, the curvature of field in the subscanning direction is kept very low, while linearity error (fθ characteristic) is satisfactorily corrected. Particularly, satisfying the condition $-2.0<f4/f<-0.8$ is beneficial with a multi-beam system, in that each of the multiple scanning beams is very well corrected.

In another particularly favorable development of the invention, the scanning lens satisfies the condition $-3.0<f1z/f2z<-1.5$, wherein f1z is a focal length of the subscanning direction of the first lens, and f2z is a focal length of the subscanning direction of the second lens. Satisfying the condition $-3.0<f1z/f2z<-1.5$ restricts the curving, in the subscanning direction, of scanning lines displaced from the optical axis in the subscanning direction. Consequently, since the scanning lines displaced from the optical axis in the Subscanning direction have a low amount of curving, the scanning lines displaced from, and along, the optical axis can be maintained satisfactorily parallel, enabling accurate imaging even in a multi-beam device. Furthermore, satisfying the condition $-3.0<f1z/f2z<-1.5$ results in a low percentage change in f-number in relation to image height, and a change in f-number which is similar for both main scanning and subscanning directions.

BRIEF DESCRIPTION OF THE DRAWINGS

FIG. 1A is a plan view of a scanning optical system to which a scanning lens of the first embodiment of the invention is applied, showing a main scanning direction;

FIG. 1B is a side view of a scanning optical system to which a scanning lens of the first embodiment is applied, showing a subscanning direction;

FIG. 3A is a plan view of a scanning optical system to which a scanning lens of the second embodiment of the invention is applied, showing a main scanning direction;

FIG. 3B is a side view of a scanning optical system to which a scanning lens of the second embodiment is applied, showing a subscanning direction;

FIG. 5A is a plan view of a scanning optical system to which a scanning lens of the third embodiment of the invention is applied, showing a main scanning direction;

FIG. 5B is a side view of a scanning optical system to which a scanning lens of the third embodiment is applied, showing a subscanning direction;

FIG. 8A is a plan view of a scanning optical system to which a scanning lens of the fourth embodiment of the invention is applied, showing a main scanning direction;

FIG. 8B is a side view of a scanning optical system to which a scanning lens of the fourth embodiment is applied, showing a subscanning direction;

FIG. 10A is an aberration diagram of the percentage change of the f-number of the optical system according to the fourth embodiment;

FIG. 10B is an aberration diagram of the curvature in the subscanning direction of the optical system according to the fourth embodiment;

FIG. 11A is a plan view of a scanning optical system to which a scanning lens of the fifth embodiment of the invention is applied, showing a main scanning direction;

FIG. 11B is a side view of a scanning optical system to which a scanning lens of the fifth embodiment is applied, showing a subscanning direction;

FIG. 14A is a plan view of a scanning optical system to which a scanning lens of the sixth embodiment of the invention is applied, showing a main scanning direction;

FIG. 14B is a side view of a scanning optical system to which a scanning lens of the sixth embodiment is applied, showing a subscanning direction;

FIG. 15A is an aberration diagram of the linearity error of the optical system according to the sixth embodiment;

FIG. 15B is an aberration diagram of the field curvature of the optical system according to the sixth embodiment;

FIG. 17A is a plan view of a scanning optical system to which a scanning lens of the seventh embodiment of the invention is applied, showing a main scanning direction;

FIG. 17B is a side view of a scanning optical system to which a scanning lens of the seventh embodiment is applied, showing a subscanning direction.

FIG. 20A is a plan view of a scanning optical system to which a scanning lens of the eighth embodiment of the invention is applied, showing a main scanning direction;

FIG. 20B is a side view of a scanning optical system to which a scanning lens of the eighth embodiment is applied, showing a subscanning direction;

FIG. 21A is an aberration diagram of the linearity error of the optical system according to the eighth embodiment;

FIG. 21B is an aberration diagram of the field curvature of the optical system according to the eighth embodiment;

FIG. 22A is an aberration diagram of the percentage change of the f-number of the optical system according to the eighth embodiment; and FIG. 22B is an aberration diagram of the curvature in the subscanning direction of the optical system according to the eighth embodiment.

DETAILED DESCRIPTION OF THE PREFERRED EMBODIMENTS

Figure 2B:
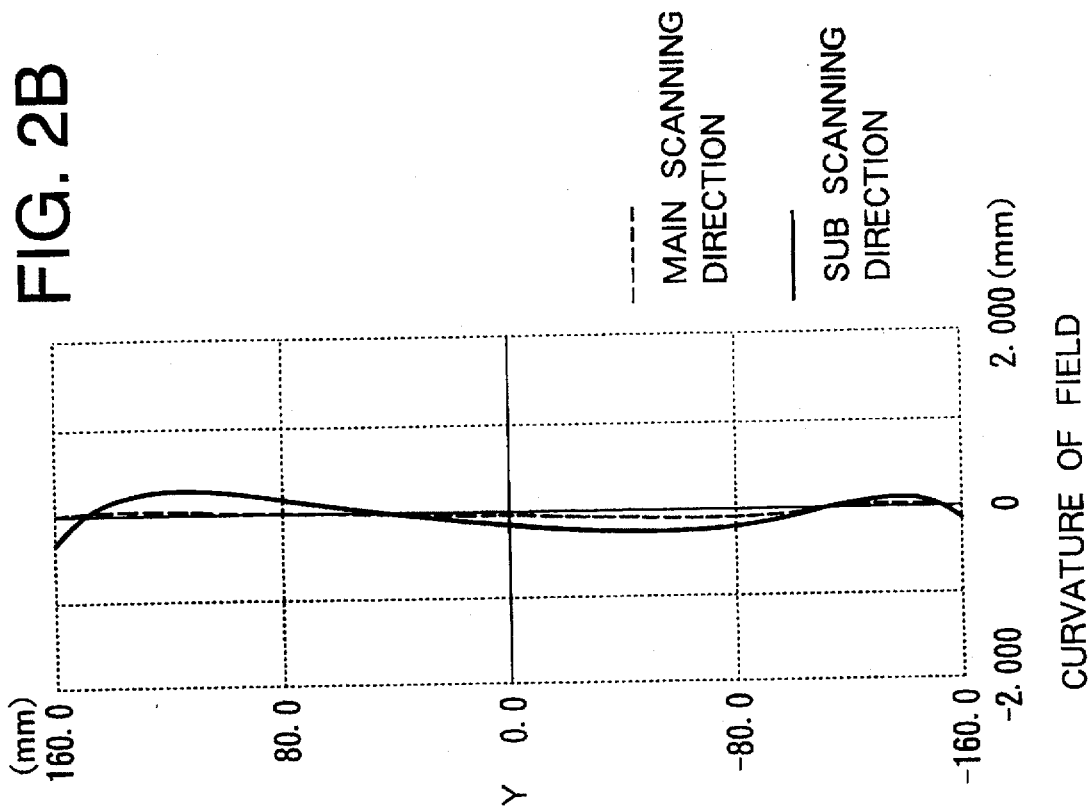
FIG. 2B is an aberration diagram of the field curvature of the optical system according to the first embodiment.

The various embodiments of a scanning lens according to the present invention are usable, for example, as an imaging optical system of a scanning optical system for a laser printer, plain paper fax machine, or the like.

First Embodiment

FIGS. 1A and 1B show the essential parts of a scanning optical system to which the fθ lens of the first embodiment has been applied. FIG. 1A is a plan view, showing the main scanning direction, while FIG. 1B is a side view, showing the sub scanning direction. The description of the elements of the first embodiment also applies to the second embodiment, excepting the focal length f, the radius of curvature in the main scanning direction Ry, the radius of curvature in the subscanning direction Rz, the distance d between surfaces along the optical axis, and the refractive index n of each lens, as shown in Tables 1 and 2.

Laser light, emitted from a light source such as a semiconductor laser (not shown), and collimated into a parallel light beam by a collimator (not shown), is passed through a cylindrical lens 1. The cylindrical lens 1 has power only in the subscanning direction and is arranged to direct the light to a rotating polygonal mirror 2. The light is then reflected and scanned by the polygonal mirror 2, and is imaged via an fθ lens 5 onto an imaging surface 4 (the scanned surface).

The cylindrical lens i has power in the subscanning direction to form a line image. Consequently, a line-shaped image of the light beam emitted from the light source is formed near rotating mirror surfaces 21 of polygonal mirror 2. The line-shaped image of the light beam, formed near the rotating mirror surfaces 21, is then re-imaged by the fθ lens 5 onto the imaging surface 4. For mirror surfaces 21 and the imaging surface 4 conjugated in this manner, the deviation of the scanned line due to the tilting error of the polygonal mirror 2 is reduced.

The fθ lens 5 comprises, in order from the polygonal mirror 2 side to the imaging surface 4 side, a first lens 5a having negative power, a second lens 5b having positive power, a third lens 5c having positive power, and a fourth lens 5d having negative power. Each of the recited powers is in both the main scanning and subscanning directions.

The first (negative) lens 5a has a spherical surface 5a1 with a negative power on the polygonal mirror 2 side, and a cylindrical surface 5a2, with a negative power only in the subscanning direction, on the imaging surface 4 side.

Accordingly, the first lens 5a has a relatively low negative power in the main scanning direction and a relatively high negative power in the subscanning direction.

The second (positive) lens 5b is a biconvex lens, having both surfaces 5b1 and 5b2 being spherical and has an equal positive power in both of the main scanning and subscanning directions.

The third (positive) lens 5c is a plano-convex toric lens having a planar surface 5c1 on the polygonal mirror 2 side, and a positive toric surface 5c2 on the imaging surface 4 side. The positive toric surface is generated about an axis of rotation in the subscanning direction, and has a stronger positive power in the subscanning direction than in the main scanning direction. Accordingly, the third lens 5c has a relatively low positive power in the main scanning direction, and a relatively high positive power in the subscanning direction.

The fourth (negative) lens 5d is a negative meniscus lens, with both surfaces 5d1 and 5d2 being spherical. The surface 5d1 on the polygonal mirror 4 side has a high negative power, and the surface 5d2 on the imaging surface 4 side has a low positive power. Fourth lens 5d acts to finally correct a remaining astigmatism that is only partially corrected by the negative cylindrical surface 5a2 of first lens 5a and the positive toric surface 5c2 of third lens 5c.

Furthermore, the fθ lens 5 of the first and second embodiments satisfies the following condition:

$$-4.0 < f4/f < -0.8 \qquad (1)$$

In condition (1), f4 is the focal length of the main scanning direction of the fourth lens 5d, and f is the focal length of the main scanning direction of the entire scanning lens 5.

By satisfying the condition (1), the curvature of field in the subscanning direction is kept low, while linearity error (fθ characteristic) is satisfactorily corrected. If the lower limit of condition (1) is not reached, the curvature of field in the subscanning direction is not corrected adequately, being excessive at the central and peripheral parts. If the upper limit is exceeded, the error in linearity (fθ characteristic) becomes unsatisfactorily high, and the scanning speed of the spot on the imaging surface 4 varies widely with the image height. Table 1 shows a specific arrangement of the scanning lens 5 of the first embodiment. In Table 1, and in Tables 2 through 8 in the following description, Ry is the radius of curvature in the main scanning direction, Rz is the radius of curvature in the subscanning direction (this column is entry in the case of a rotationally symmetric surface, since Rz=Ry), d is the distance between surfaces along the optical axis (in mm), and n is the refractive index of the lens.

In Tables 1 and 2, in order along the path of the light beam from the light source, Surface Nos. 1 and 2 describe surfaces (11 and 12 in FIGS. 1A, 1B, 3A, and 3B) of the cylindrical lens 1, Surface No. 3 describes the mirror surfaces (21 in FIGS. 1A, 1B, 3A, and 3B) of the polygonal mirror 2, Surface Nos. 4 and 5 describe the surfaces 5a1 and 5a2 of the first lens 5a, Surface Nos. 6 and 7 describe the surfaces 5b1 and 5b2 of the second lens 5b, Surface Nos. 8 and 9 describe the surfaces 5c1 and 5c2 of the third lens 5c, and Surface Nos. 10 and 11 describe the surfaces 5d1 and 5d2 of the fourth lens 5d. In the first embodiment, the focal length f of the main scanning direction of the fθ scanning lens 5 is 299.426 mm.

TABLE 1

| SURFACE NO. | Ry | Rz | d | n |
|---|---|---|---|---|
| 1 | ∞ | 48.410 | 4.000 | 1.51072 |
| 2 | ∞ | — | 84.910 | — |
| 3 | ∞ | — | 88.691 | — |
| 4 | −315.701 | — | 10.000 | 1.51072 |
| 5 | ∞ | 49.756 | 11.512 | — |
| 6 | 1457.787 | — | 30.000 | 1.78569 |
| 7 | −173.553 | — | 4.170 | — |
| 8 | ∞ | — | 16.456 | 1.71230 |
| 9 | −368.726 | −53.605 | 14.348 | — |
| 10 | −188.363 | — | 10.000 | 1.51072 |
| 11 | −2070.923 | — | 268.128 | — |

Figure 2A:
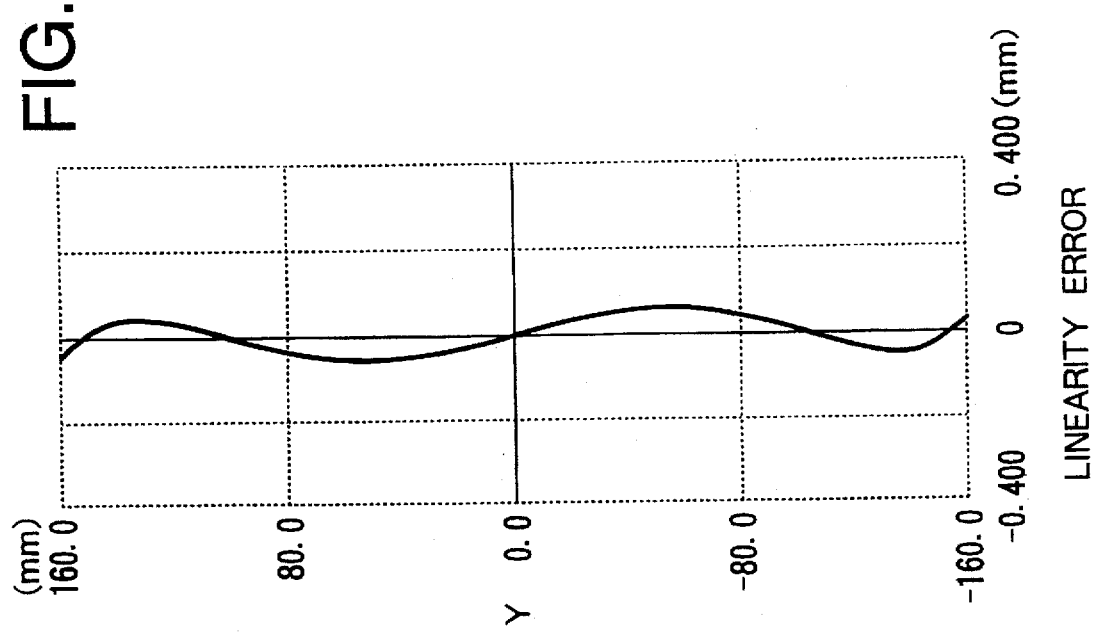
FIG. 2A is an aberration diagram of the linearity error of the optical system according to the first embodiment.

FIG. 2A is an aberration diagram showing the linearity error, and FIG. 2B is an aberration diagram showing the curvature of field, of the scanning optical system with the arrangement of the first embodiment. In FIGS. 2A and 2B, the ordinate axis Y of each diagram indicates the image height (in mm) in the main scanning direction. FIG. 2A shows the errors in linearity (fθ characteristic), and the abscissa axis of FIG. 2A indicates the amount of deviation (in mm) of the image point position in the main scanning direction. In FIG. 2B, the broke line indicates the focal point position in the main scanning direction, while the solid line indicates the focal point position in the subscanning direction. The abscissa axis of FIG. 2B indicates the amount of deviation (in mm) of the focal point position in the optical axis direction.

Second Embodiment

FIGS. 3A and 3B show the essential parts of the scanning optical system to which the scanning lens of the second embodiment has been applied. FIG. 3A is a plan view, showing the main scanning direction, while FIG. 3B is a side view, showing the subscanning direction. As previously described, the description of the first embodiment generally applies to the second embodiment, excepting the noted parameters (shown in Table 2). Table 2 shows a specific numerical arrangement of the second embodiment. In the second embodiment, the focal length f of the main scanning direction of the fθ lens 5 is 299.659 mm.

TABLE 2

| SURFACE NO. | Ry | Rz | d | n |
|---|---|---|---|---|
| 1 | ∞ | 43.410 | 4.000 | 1.51072 |
| 2 | ∞ | — | 84.910 | — |
| 3 | ∞ | — | 95.000 | — |
| 4 | −321.842 | — | 10.354 | 1.54024 |
| 5 | ∞ | 59.465 | 6.215 | — |
| 6 | 2240.506 | — | 30.000 | 1.74411 |
| 7 | −192.939 | — | 3.903 | — |
| 8 | ∞ | — | 20.738 | 1.71230 |
| 9 | −266.583 | −52.260 | 8.9 | — |
| 10 | −210.712 | — | 10.000 | 1.51072 |
| 11 | −1686.786 | — | 279.789 | — |

Figure 4B:
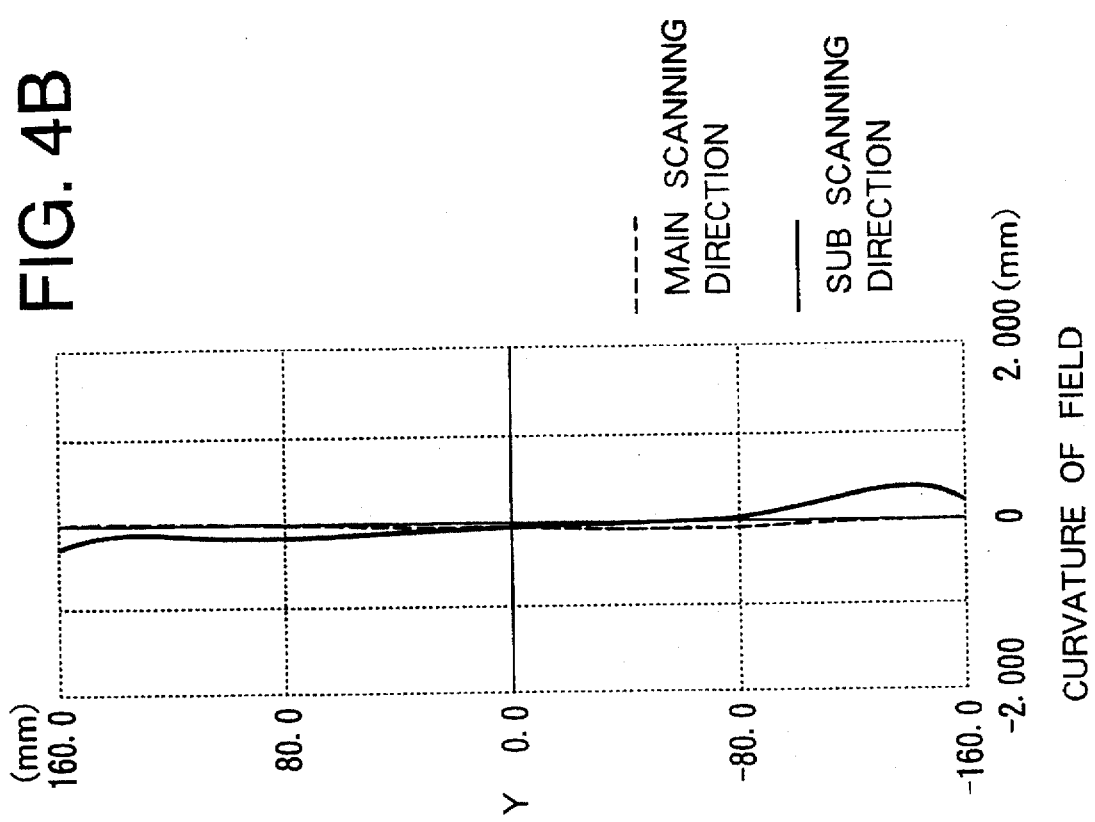
FIG. 4B is an aberration diagram of the field curvature of the optical system according to the second embodiment.
Figure 4A:
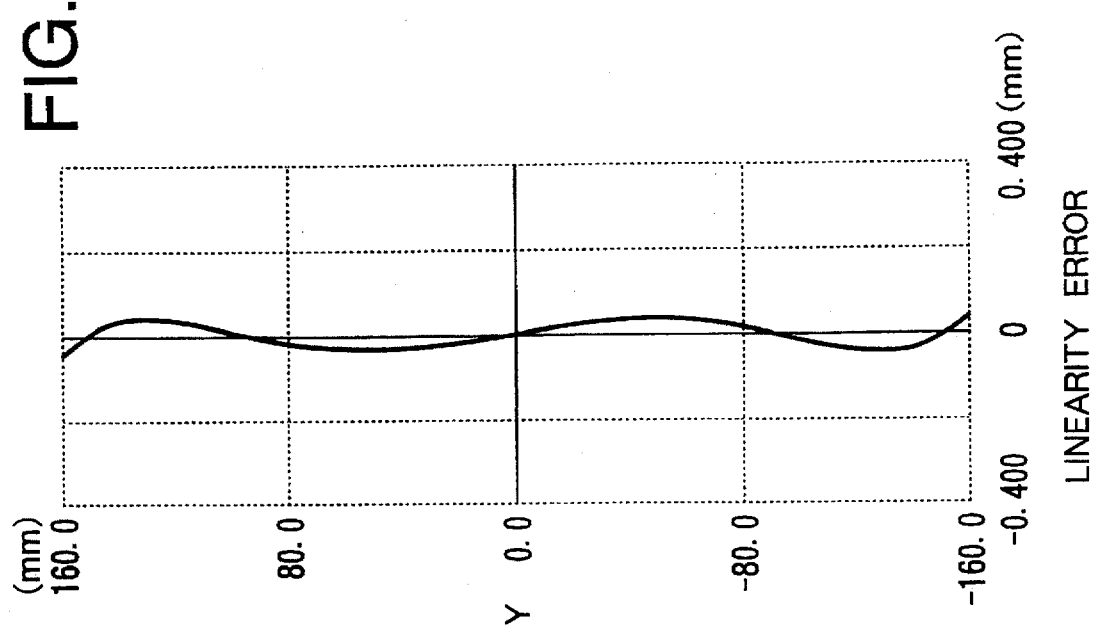
FIG. 4A is an aberration diagram of the linearity error of the optical system according to the second embodiment.

FIG. 4A is an aberration diagram showing the linearity error, and FIG. 4B is an aberration diagram showing the curvature of field, of the scanning optical system with the arrangement of the second embodiment. The axes and indication lines of FIGS. 4A and 4B, describing the second embodiment, represent the same factors as those of FIGS. 2A and 2B of the first embodiment, respectively.

The four-element arrangement of the first and second embodiments according to the present invention remove astigmatism that is partially corrected by the negative cylindrical surface of first lens 5a and the positive toric surface of third lens 5c.

By correcting the astigmatism with this four-element arrangement, the curvatures of field in the main scanning direction and the subscanning direction are kept at low levels and while the curvature of field in the subscanning direction is satisfactorily corrected, as is the curvature of field in the main scanning direction.

Third Embodiment

The third through eighth embodiments present scanning lenses having low field curvature in both main and subscanning directions, and a satisfactory fθ characteristic (linearity). Furthermore, in order to increase imaging speed, multi-beam scanning systems having multiple parallel scanning lines, some offset from the optical axis in the subscanning direction, have been proposed. However, correcting aberrations of the lenses so that these offset scanning lines are properly produced has also been difficult to achieve. In the third through eighth embodiments, the amount of curving of the scanning lines displaced from the optical axis in the subscanning direction is low. Furthermore, the third through eighth embodiments present lenses having a low percentage change in f-number in relation to image height, and a change in f-number which is similar for beth main scanning and subscanning directions.

FIGS. 5A and 5B show the essential parts of the scanning optical system to which the scanning lens of the third embodiment has been applied. FIG. 5A is a plan view, showing the main scanning direction, while FIG. 5B is a side view, showing the subscanning direction. The description of the elements of the third embodiment also applies to the fourth through eighth embodiments, excepting the focal length f, the radius of curvature in the main scanning direction Ry, the radius of curvature in the subscanning direction Rz, the distance d between surfaces along the optical axis (in mm), and the refractive index n of each lens, as shown in Tables 3 through 8.

The first (negative) lens 5a has a spherical surface 5a1 with a negative power on the polygonal mirror 2 side, and a cylindrical surface 5a2, with a negative power only in the subscanning direction, on the imaging surface 4 side. Accordingly, the first lens 5a has a relatively low negative power in the main scanning direction and a relatively high negative power in the subscanning direction.

The second (positive) lens 5e is a lens having a convex spherical surface 5e1 on the polygonal mirror 2 side, and a positive toric surface 5e2 on the imaging surface 4 side. The positive toric surface 5e2 is generated about an axis of rotation in the subscanning direction and has a higher positive power in the subscanning direction than in the main scanning direction. Accordingly, the second lens 5e has a relatively low positive power in the main scanning direction, and a relatively high positive scanning power in the subscanning direction.

The third (positive) lens 5f is a plano-convex lens with a planar surface 5f1 on the polygonal mirror 2 side and a convex spherical surface 5f2 on the imaging surface 4 side. The third lens 5f therefore has an equal positive power in both the main scanning and subscanning directions.

The fourth (negative) lens 5d is a negative meniscus lens, with both surfaces 5d1 and 5d2 being spherical. The surface 5d1 on the polygonal mirror 4 side has a high negative power, and the surface 5d2 on the imaging surface 4 side has a low positive power. Fourth lens 5d acts to finally correct remaining astigmatism that is only partially corrected by the negative cylindrical surface of first lens 5a and the positive toric surface of third lens 5f.

The fθ lenses 5 of the third through eighth embodiments satisfy the Conditions (2) and (3):

$-2.0 < f4/f < -0.8$ (2)

$-3.0 < f1z/f2z < -1.5$ (3)

In Conditions (2) and (3), f4 is the focal length of the main scanning direction of the fourth lens 5d, f is the focal length of the main scanning direction of the entire fθ scanning lens 5, and f1z and f2z are the focal lengths of the subscanning direction of the first and second lenses 5a and 5e, respectively.

Condition (2) restricts the range of condition (1), by raising the lower limit of condition (1). Condition (2) corrects the curvature of field in the subscanning direction and the error in linearity (fθ characteristic) more favorably than in the first and second embodiments. If the lower limit of condition (2) is not reached, the curvature of field in the subscanning direction is not corrected adequately at higher values of image height. If the upper limit of condition (2) is exceeded, the curvature of field is overcorrected, and the error in linearity ( fθ characteristic) becomes large, causing the scanning speed of the spot on the imaging surface to vary widely with the image height.

Condition (3) restricts the curving of scanning lines displaced from the optical axis in the subscanning direction. When the lower limit of condition (3) is not reached, scanning lines displaced from the optical axis in the subscanning direction curve away from a straight line passing along the optical axis in the main scanning direction, as the image height increases (that is, toward the ends of the scanning line in the main scanning direction). When the upper limit is exceeded, scanning lines displaced from the optical axis in the subscanning direction curve toward a straight line passing along the optical axis in the main scanning direction, as the image height increases. Furthermore, when Condition (3) is satisfied, the percentage change of the f-number is held relatively low and the beam diameter on the imaging surface 4 can be maintained constant regardless of the image height.

Table 3 shows a specific arrangement of the third embodiment. In Table 3, as previously described, Ry is the radius of curvature in the main scanning direction, Rz is the radius of curvature in the subscanning direction (this column is empty in the case of a rotationally symmetric surface, since Rz=Ry), d is the distance between surfaces along the optical axis (in mm), and n is the refractive index of the lens.

In Tables 3 through 8, in order along the path of the light beam from the light source, Surface Nos. 1 and 2 describe surfaces (11 and 12 in FIGS. 5A and 5B and in corresponding Figures for the remaining embodiments) of the cylindrical lens 1, Surface No. 3 describes the mirror surfaces (21 in FIGS. 5A and 5B and in corresponding Figures for the remaining embodiments) of the polygonal mirror 2, Surface Nos. 4 and 5 describe the surfaces 5a1 and 5a2 of the first lens 5a, Surface Nos. 6 and 7 describe the surfaces 5e1 and 5e2 of the second lens 5e, Surface Nos. 8 and 9 describe the surfaces 5f1 and 5f2 of the third lens 5f, and Surface Nos. 10 and 11 describe the surfaces 5d1 and 5d2 of the fourth lens 5d. In the third embodiment, the focal length f of the main scanning direction of the fθ lens 5 is 299.359 mm. Furthermore, the f-number at the center (in the main scanning direction) of the scan is 1:24.9 in the main scanning direction and 1:34.6 in the subscanning direction.

TABLE 3

| SURFACE NO. | Ry | Rz | d | n |
|---|---|---|---|---|
| 1 | ∞ | 43.410 | 54.000 | 1.51072 |
| 2 | ∞ | — | 84.910 | — |
| 3 | ∞ | — | 79.758 | — |
| 4 | −327.885 | — | 10.000 | 1.60910 |
| 5 | ∞ | 105.195 | 12.543 | — |
| 6 | 1570.697 | — | 30.000 | 1.78569 |
| 7 | −182.065 | −53.548 | 7.623 | — |
| 8 | ∞ | — | 25.000 | 1.71230 |
| 9 | −246.756 | — | 10.048 | — |
| 10 | −192.362 | — | 10.000 | 1.60910 |
| 11 | −2753.858 | — | 270.993 | — |

Figure 6B:
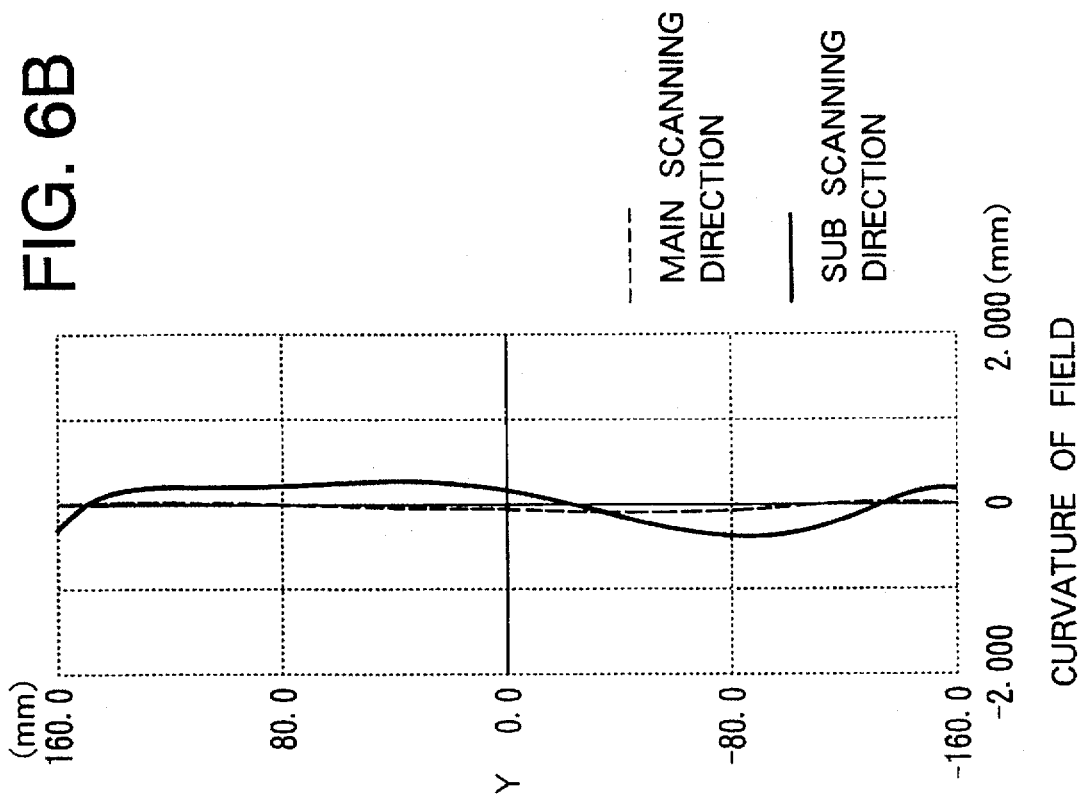
FIG. 6B is an aberration diagram of the field curvature of the optical system according to the third embodiment.
Figure 6A:
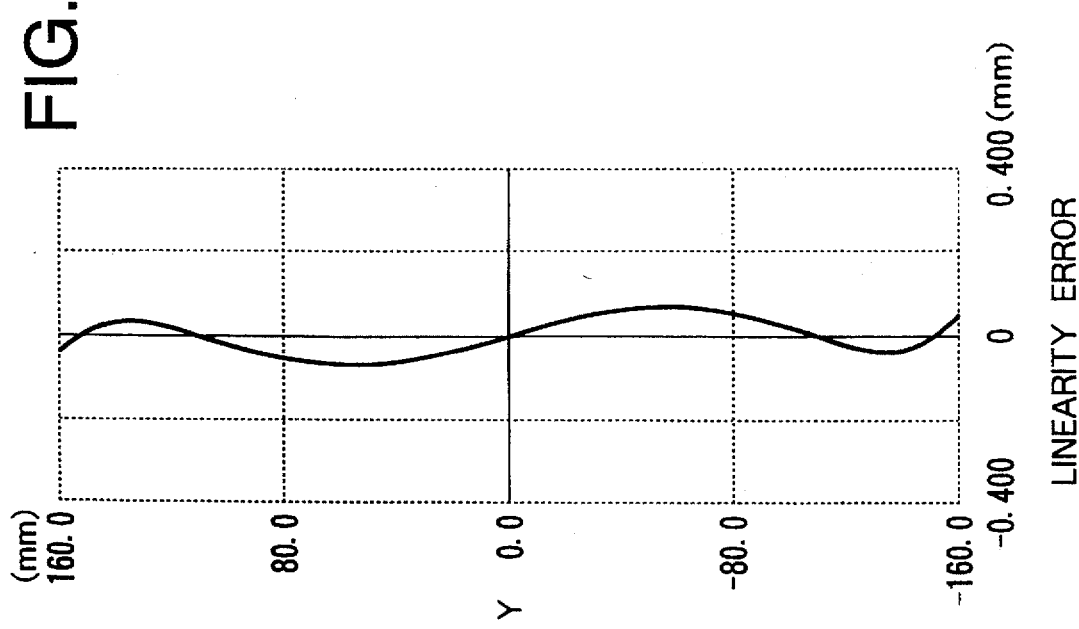
FIG. 6A is an aberration diagram of the linearity error of the optical system according to the third embodiment.
Figure 7A:
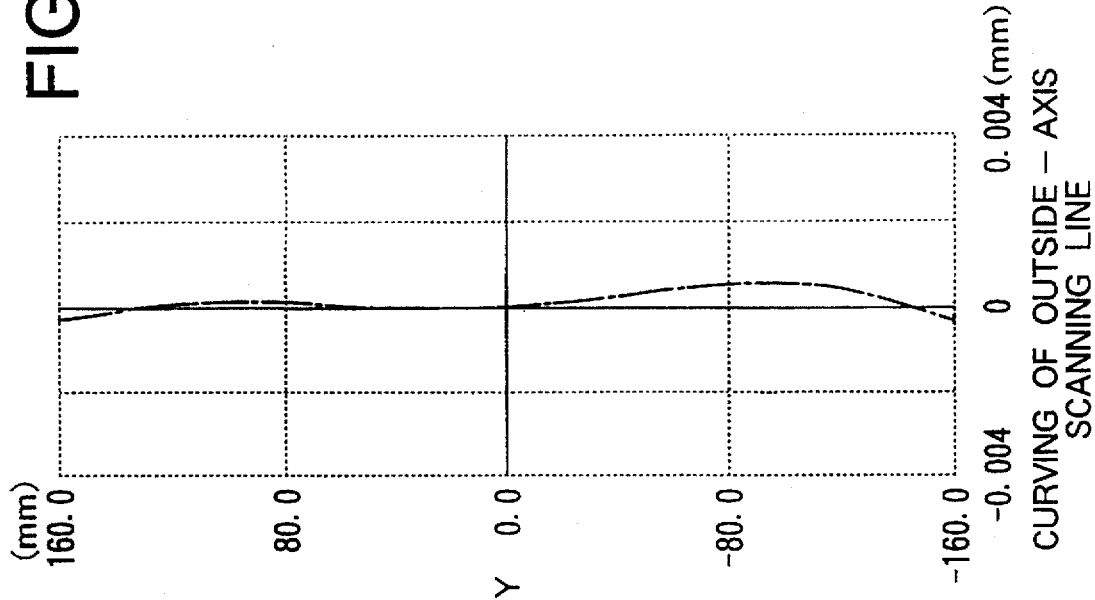
FIG. 7A is an aberration diagram of the percentage change of the f-number of the optical system according to the third embodiment.
Figure 7B:
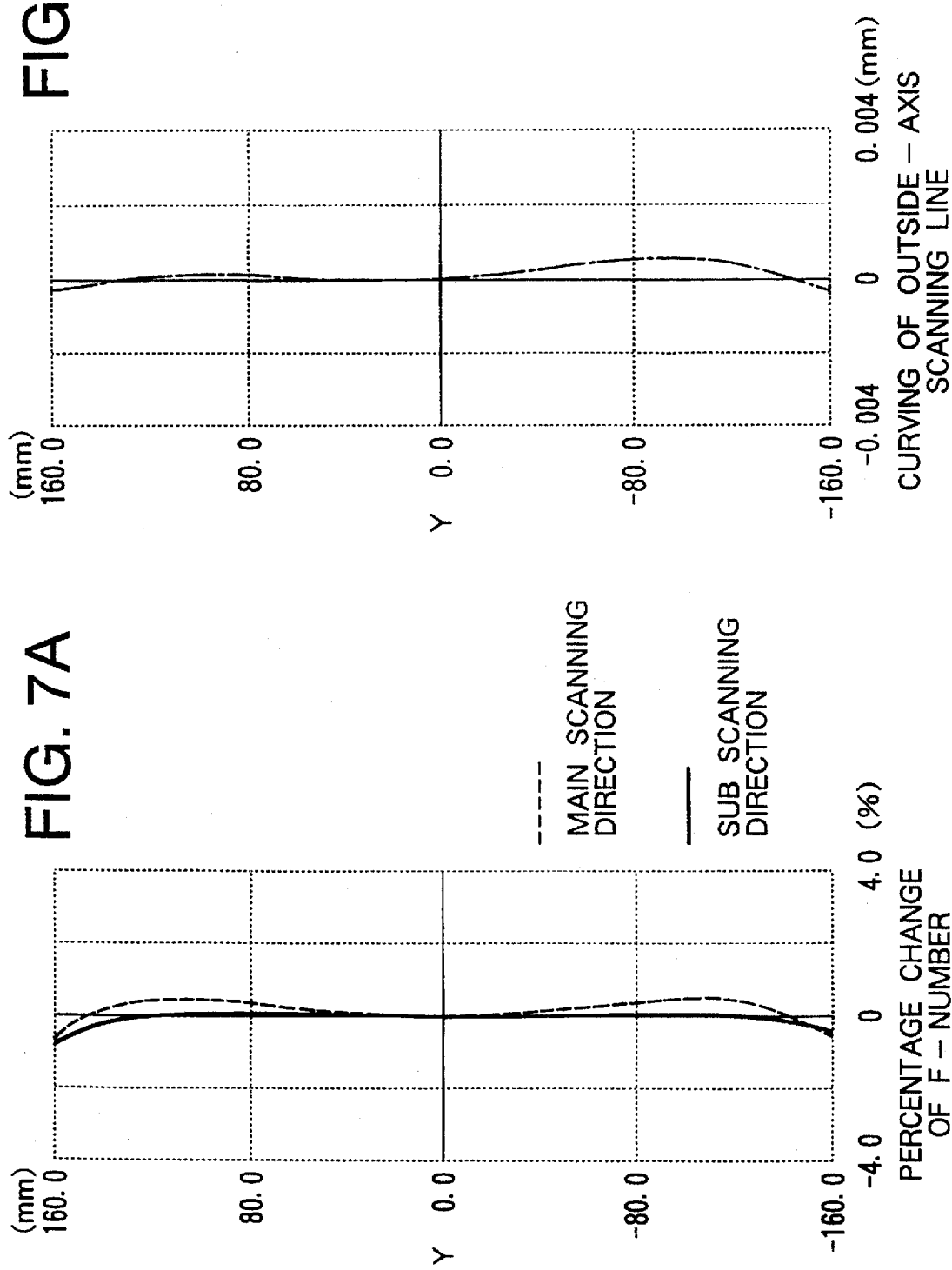
FIG. 7B is an aberration diagram of the curvature in the subscanning direction of the optical system according to the third embodiment.

FIGS. 6A, 6B, 7A, and 7B show the various aberrations of the scanning optical system with the arrangement of the third embodiment. FIG. 6A shows the linearity error, FIG. 6B shows the curvature of field, FIG. 7A shows the percentage change of the f-number, and FIG. 7B shows the curving of a scanning line displaced by 0.12 mm from the optical axis in the subscanning direction. The axes and indication lines of FIGS. 6A and 6B, describing the third embodiment, represent the same factors as those of FIGS. 2A and 2B of the first embodiment, respectively.

FIG. 7A shows the percentage change of the f-number of the third embodiment of a scanning lens. In FIG. 7A, the broken line indicates the percentage change in the main scanning direction, while the solid line indicates the same in the subscanning direction. The abscissa axis of FIG. 7A indicates the percentage change (%) of the f-number in the main scanning direction. FIG. 7B shows the curving of a scanning line scanning a position displaced 0.12 mm from the optical axis in the subscanning direction, for the third embodiment of a scanning lens. The abscissa axis of FIG. 3B indicates the amount of deviation (in mm) in the subscanning direction from an ideal, straight scanning line.

Fourth Embodiment

FIGS. 8A and 8B show the essential parts of the scanning optical system to which the scanning lens of the fourth embodiment has been applied. FIG. 8A is a plan view, showing the main scanning direction, while FIG. 8B is a side view, showing the subscanning direction. Table 4 shows a specific numerical arrangement of the fourth embodiment. In the fourth embodiment, the focal length f of the main scanning direction of the fθ lens 5 is 349.743 mm. Furthermore, the f-number at the center (in the main scanning direction) of the scan is 1:25.0 in the main scanning direction and 1:33.6 in the subscanning direction.

TABLE 4

| SURFACE NO. | Ry | Rz | d | n |
|---|---|---|---|---|
| 1 | ∞ | 43.410 | 4.000 | 1.51072 |
| 2 | ∞ | — | 84.910 | — |
| 3 | ∞ | — | 98.930 | — |
| 4 | −390.375 | — | 12.000 | 1.60910 |
| 5 | ∞ | 122.800 | 16.728 | — |
| 6 | 1914.833 | — | 30.000 | 1.78569 |
| 7 | −215.086 | −63.880 | 6.416 | — |
| 8 | ∞ | — | 23.423 | 1.71230 |
| 9 | −294.136 | — | 10.000 | — |
| 10 | −228.682 | — | 10.000 | 1.60910 |
| 11 | −2386.269 | — | 326.732 | — |

Figures 9A, 9B:
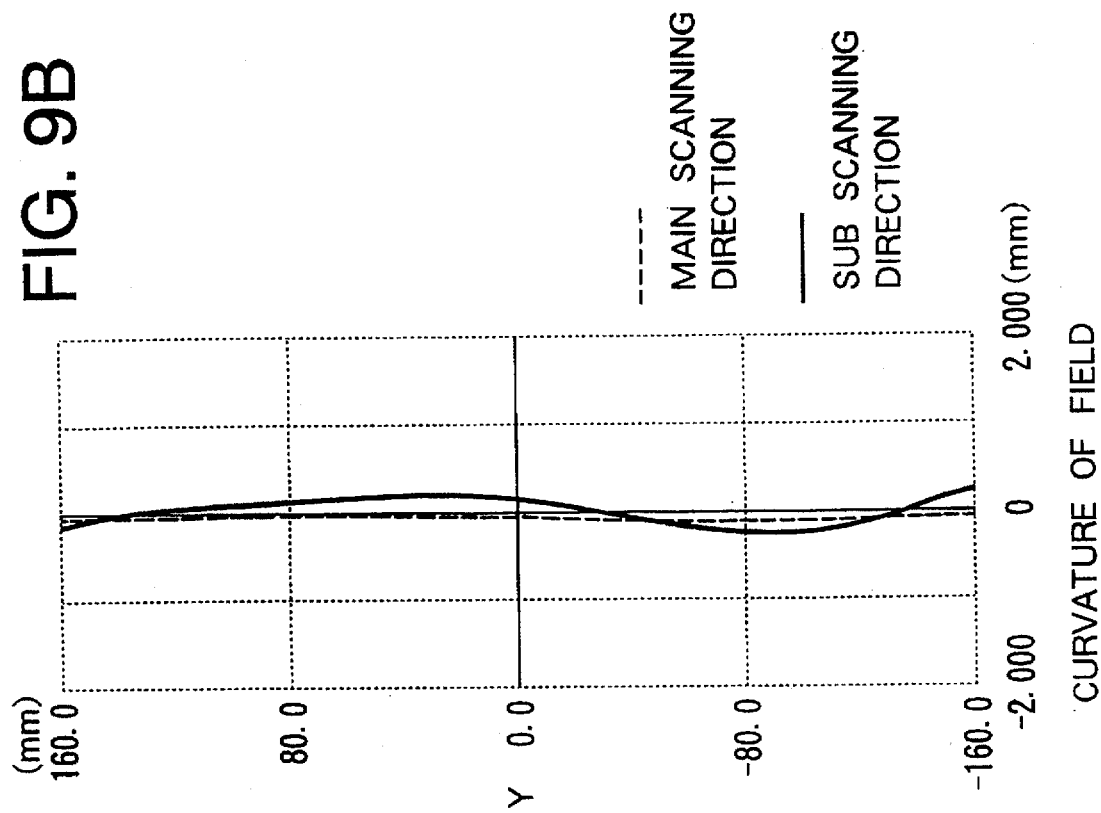
FIG. 9A is an aberration diagram of the linearity error of the optical system according to the fourth embodiment.
FIG. 9B is an aberration diagram of the field curvature of the optical system according to the fourth embodiment.

FIGS. 9A, 9B, 10A, and 10B show the various aberrations of the scanning optical system with the arrangement of the fourth embodiment. FIG. 9A shows the linearity error, FIG. 9B shows the curvature of field, FIG. 10A shows the percentage change of the f-number, and FIG. 10B shows the curving of a scanning line displaced by 0.12 mm from the optical axis in the subscanning direction. The axes and indication lines of FIGS. 9A, 9B, 10A, and 10B represent the same aberrations as those previously discussed in the third embodiment.

Fifth Embodiment

FIGS. 11A and 11B show the essential parts of a scanning optical system to which the scanning lens of the fifth embodiment has been applied. FIG. 11A is a plan view, showing the main scanning direction, while FIG. 11B is a side view, showing the subscanning direction. Table 5 shows a specific numerical arrangement of the fifth embodiment. In the fifth embodiment, the focal length f of the main scanning direction of the fθ lens 5 is 299.359 mm. Furthermore, the f-number at the center (in the main scanning direction) of the scan is 1:24.9 in the main scanning direction and 1:36.2 in the subscanning direction.

TABLE 5

| SURFACE NO. | Ry | Rz | d | n |
| --- | --- | --- | --- | --- |
| 1 | ∞ | 43.410 | 4.000 | 1.51072 |
| 2 | ∞ | — | 84.910 | — |
| 3 | ∞ | — | 86.355 | — |
| 4 | −347.664 | — | 10.000 | 1.60910 |
| 5 | ∞ | 102.337 | 9.247 | — |
| 6 | 1209.936 | — | 19.344 | 1.78569 |
| 7 | −207.001 | −51.202 | 76.312 | — |
| 8 | −1619.302 | — | 21.858 | 1.71230 |
| 9 | −246.758 | — | 11.674 | — |
| 10 | −197.334 | — | 10.000 | 1.60910 |
| 11 | −527.029 | — | 214.799 | — |

Figure 12A:
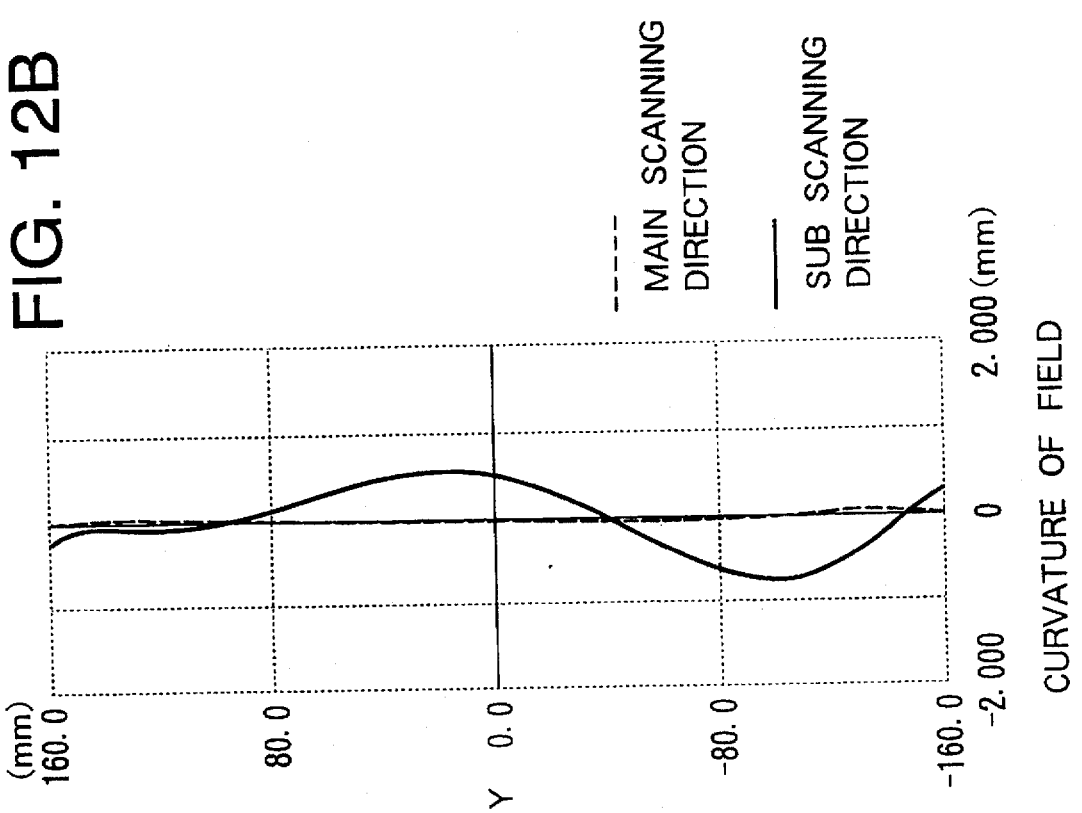
FIG. 12A is an aberration diagram of the linearity error of the optical system according to the fifth embodiment.
Figure 12B:
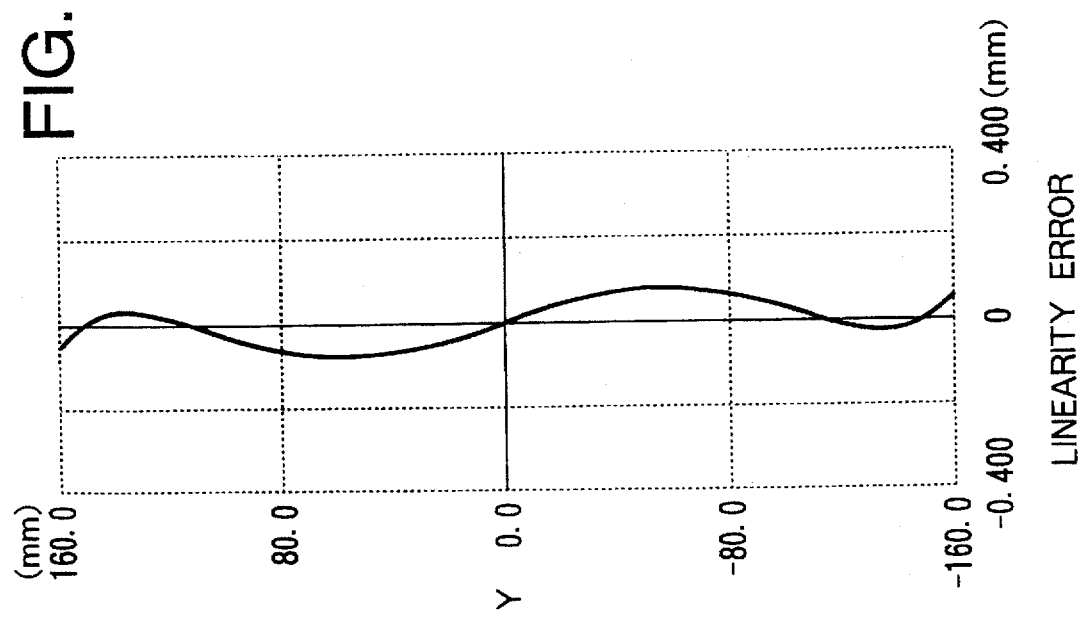
FIG. 12B is an aberration diagram of the field curvature of the optical system according to the fifth embodiment.
Figure 13A:
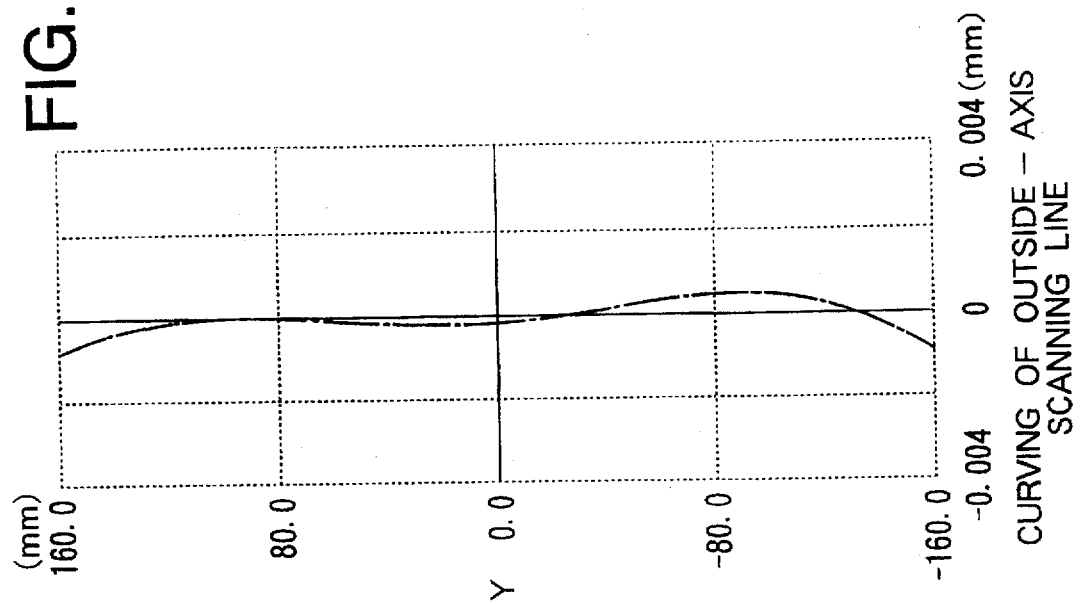
FIG. 13A is an aberration diagram of the percentage change of the f-number of the optical system according to the fifth embodiment.
Figure 13B:
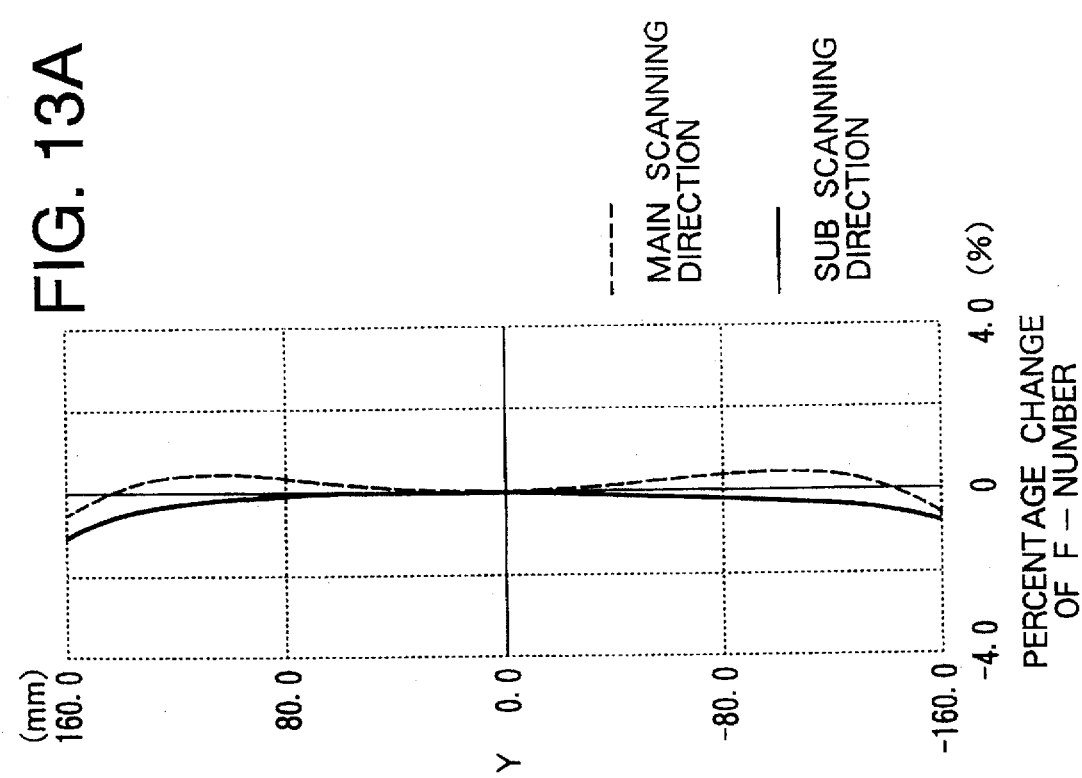
FIG. 13B is an aberration diagram of the curvature in the subscanning direction of the optical system according to the fifth embodiment.

FIGS. 12A, 12B, 13A, and 13B show the various aberrations of the scanning optical system with the arrangement of the fifth embodiment. FIG. 12A shows the linearity error, FIG. 12B shows the curvature of field, FIG. 13A shows the percentage change of the f-number, and FIG. 13B shows the curving of a scanning line displaced by 0.12 mm from the optical axis in the subscanning direction. The axes and indication lines of FIGS. 12A, 12B, 13A, and 13B represent the same aberrations as those previously discussed in the third embodiment.

Sixth Embodiment

FIGS. 14A and 14B show the essential parts of a scanning optical system to which the scanning lens of the sixth embodiment has been applied. FIG. 14A is a plan view, showing the main scanning direction, while FIG. 14B is a side view, showing the subscanning direction. Table 6 shows a specific numerical arrangement of the sixth embodiment. In the sixth embodiment, the focal length f of the main scanning direction of the fθ lens 5 is 299.143 mm. Furthermore, the f-number at the center (in the main scanning direction) of the scan is 1:24.9 in the main scanning direction and 1:35.8 in the subscanning direction.

TABLE 6

| SURFACE NO. | Ry | Rz | d | n |
| --- | --- | --- | --- | --- |
| 1 | ∞ | 43.410 | 4.000 | 1.51072 |
| 2 | ∞ | — | 84.910 | — |
| 3 | ∞ | — | 63.746 | — |
| 4 | −252.413 | — | 25.146 | 1.60910 |
| 5 | ∞ | 105.423 | 13.288 | — |
| 6 | 1695.298 | — | 20.000 | 1.78569 |
| 7 | −167.625 | −51.191 | 1.000 | — |
| 8 | −3580.931 | — | 20.000 | 1.71230 |

TABLE 6-continued

| SURFACE NO. | Ry | Rz | d | n |
| --- | --- | --- | --- | --- |
| 9 | −213.870 | — | 9.957 | — |
| 10 | −172.458 | — | 10.000 | 1.60910 |
| 11 | 5670.706 | — | 286.582 | — |

Figures 16A, 16B:
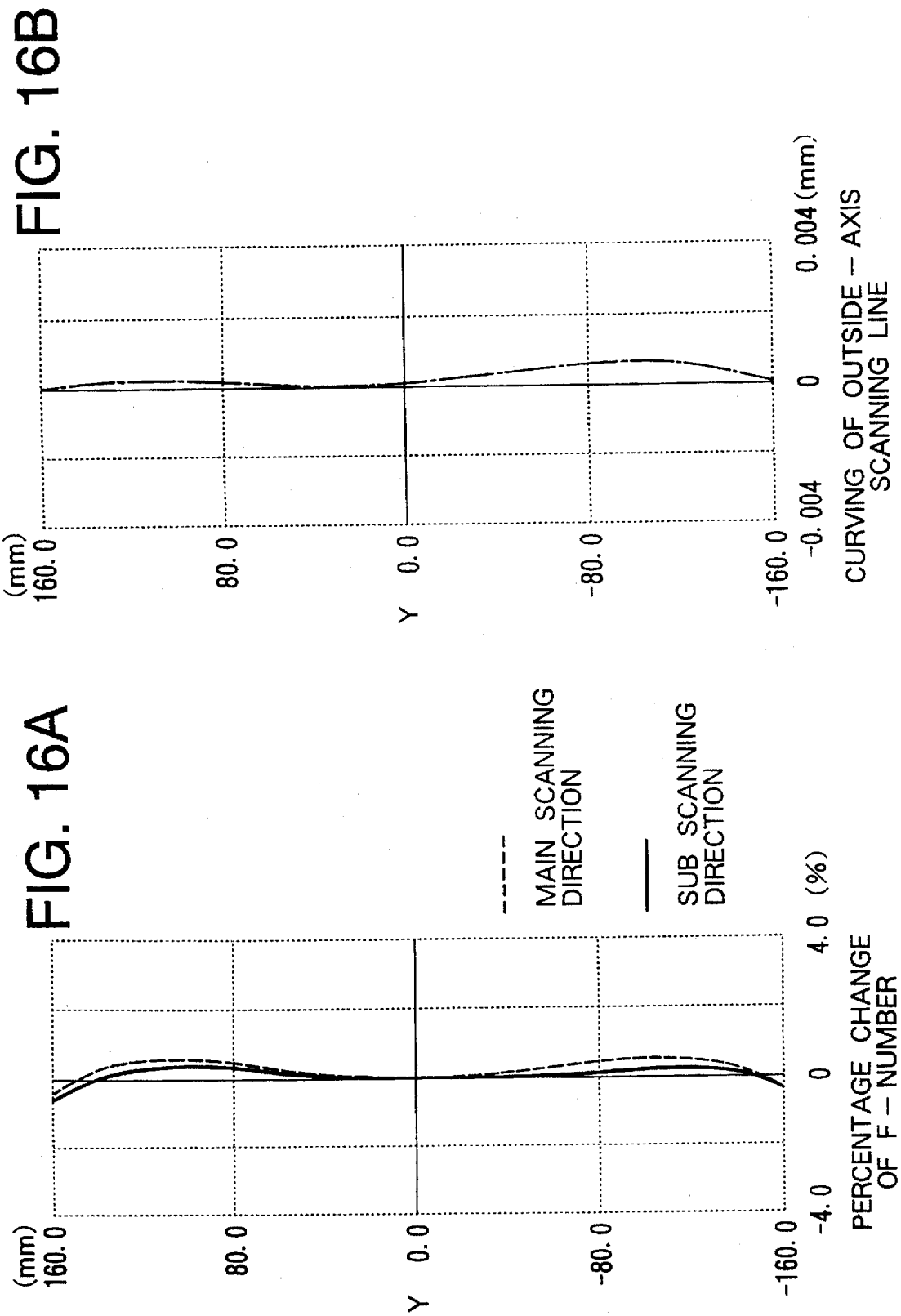
FIG. 16A is an aberration diagram of the percentage change of the f-number of the optical system according to the sixth embodiment.
FIG. 16B is an aberration diagram of the curvature in the subscanning direction of the optical system according to the sixth embodiment.

FIGS. 15A, 15B, 16A, and 16B show the various aberrations of the stanching optical system with the arrangement of the sixth embodiment. FIG. 15A shows the linearity error, FIG. 15B shows the curvature of field, FIG. 16A shows the percentage change of the f-number, and FIG. 16B shows the curving of a scanning line displaced by 0.12 mm from the optical axis in the subscanning direction. The axes and indication lines of FIGS. 15A, 15B, 16A, and 16B represent the same aberrations as those previously discussed in the third embodiment.

Seventh Embodiment

FIGS. 17A and 17B shows the essential parts of a scanning optical system to which the scanning lens of the seventh embodiment has been applied. FIG. 17A is a plan view, showing the main scanning direction, while FIG. 17B is a side view, showing the subscanning direction. Table 7 shows a specific numerical arrangement of the seventh embodiment. In the seventh embodiment, the focal length f of the main scanning direction of the fθ lens 5 is 299.448 mm. Furthermore, the f-number at the center (in the main scanning direction) of the scan is 1:24.9 in the main scanning direction and 1:34.4 in the subscanning direction.

TABLE 7

| SURFACE NO. | Ry | Rz | d | n |
| --- | --- | --- | --- | --- |
| 1 | ∞ | 43.410 | 4.000 | 1.51072 |
| 2 | ∞ | — | 84.910 | — |
| 3 | ∞ | — | 102.408 | — |
| 4 | −498.274 | — | 10.000 | 1.60910 |
| 5 | ∞ | 183.500 | 4.000 | — |
| 6 | 1665.304 | — | 30.000 | 1.78569 |
| 7 | −198.999 | −59.250 | 1.000 | — |
| 8 | −1047.253 | — | 25.000 | 1.71230 |
| 9 | −256.165 | — | 10.607 | — |
| 10 | −197.994 | — | 10.000 | 1.60910 |
| 11 | −654.104 | — | 274.942 | — |

Figure 18B:
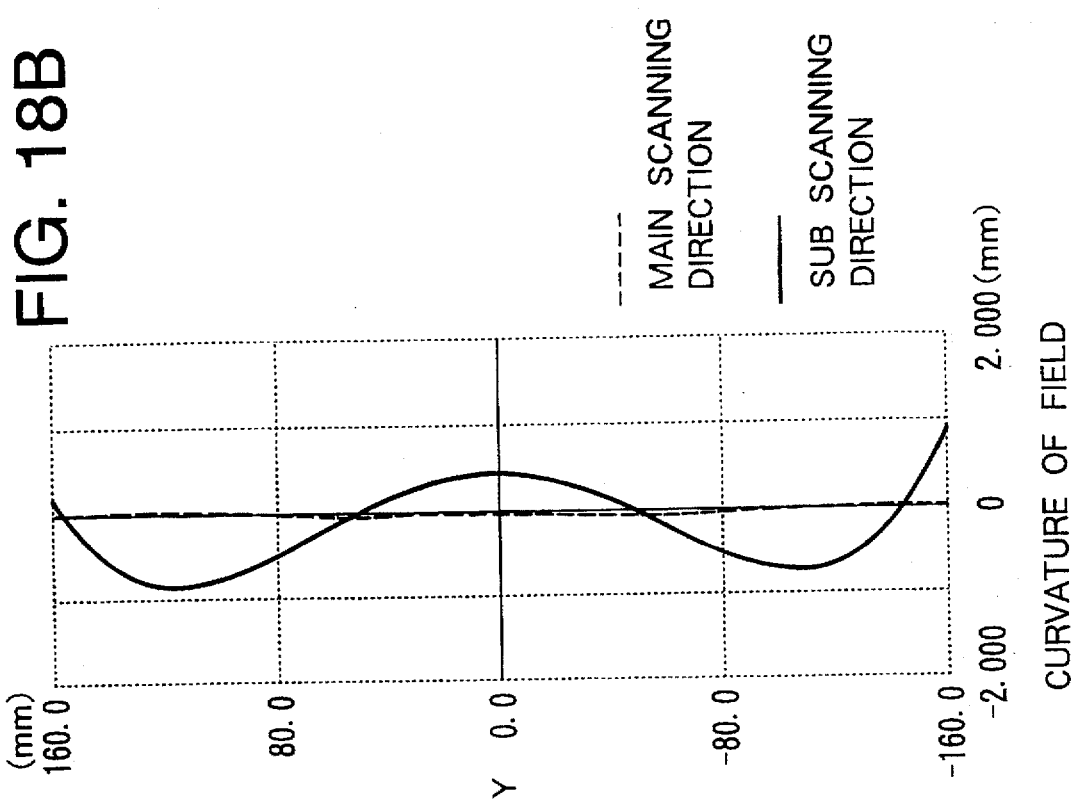
FIG. 18B is an aberration diagram of the field curvature of the optical system according to the seventh embodiment.
Figure 18A:
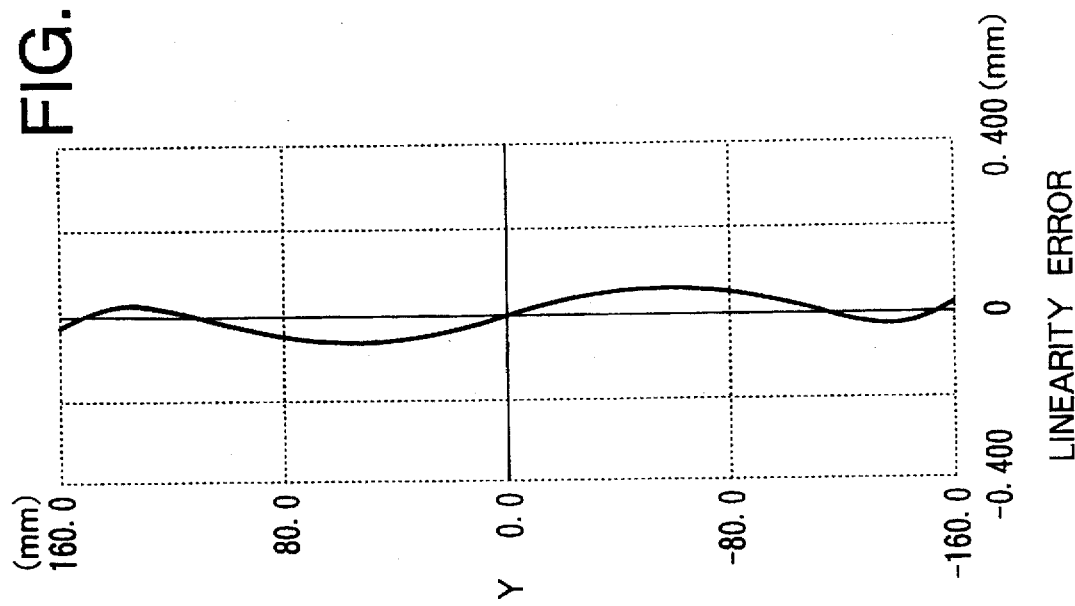
FIG. 18A is an aberration diagram of the linearity error of the optical system according to the seventh embodiment.
Figure 19A:
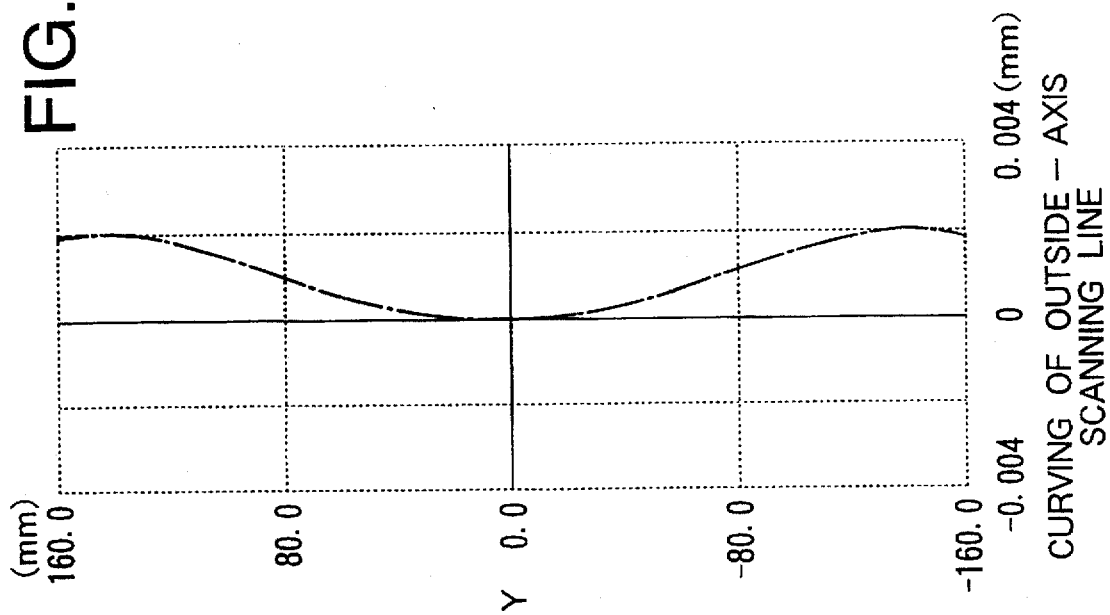
FIG. 19A is an aberration diagram of the percentage change of the f-number of the optical system according to the seventh embodiment.
Figure 19B:
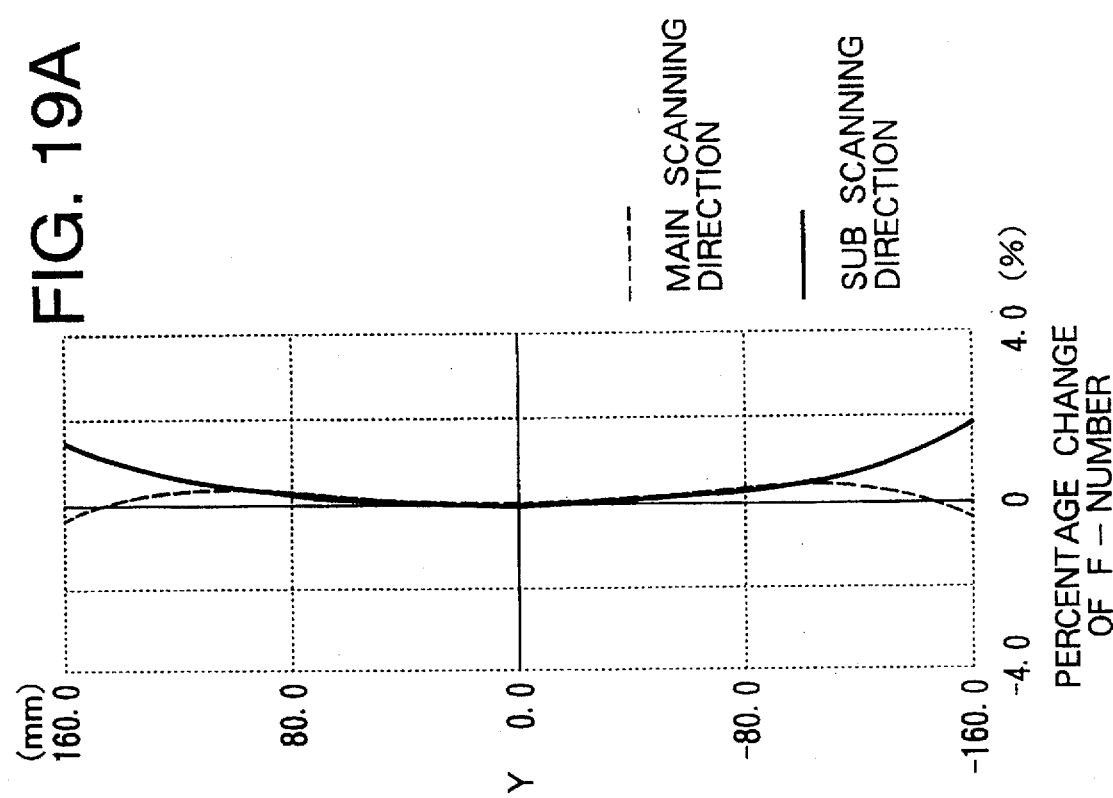
FIG. 19B is an aberration diagram of the curvature in the subscanning direction of the optical system according to the seventh embodiment.

FIGS. 18A, 18B, 19A, and 19B show the various aberrations of the scanning optical system with the arrangement of the seventh embodiment. FIG. 18A shows the linearity error, FIG. 18B shows the curvature of field, FIG. 19A shows the percentage change of the f-number, and FIG. 19B shows the curving of a scanning line displaced by 0.12 mm from the optical axis in the subscanning direction. The axes and indication lines of FIGS. 18A, 18B, 19A, and 19B represent the same aberrations as those previously discussed in the third embodiment.

Eighth Embodiment

FIGS. 20A and 20B show the essential parts of a scanning optical system to which the scanning lens of the eighth embodiment has been applied. FIG. 20A is a plan view, showing the main scanning direction, while FIG. 20B is a side view, showing the subscanning direction. Table 8 shows a specific numerical arrangement of the eighth embodiment. In the eighth embodiment, the focal length f of the main scanning direction of the fθ lens 5 is 299.364 mm. Furthermore, the f-number at the center (in the main scanning direction) of the scan is 1:24.9 in the main scanning direction and 1:35.2 in the subscanning direction.

TABLE 8

| SURFACE NO. | Ry | Rz | d | n |
|---|---|---|---|---|
| 1 | ∞ | 43.410 | 4.000 | 1.51072 |
| 2 | ∞ | — | 84.910 | — |
| 3 | ∞ | — | 73.530 | — |
| 4 | −368.531 | — | 10.000 | 1.60910 |
| 5 | ∞ | 69.000 | 16.966 | — |
| 6 | 1485.554 | — | 30.000 | 1.78569 |
| 7 | −182.549 | −50.460 | 10.457 | — |
| 8 | −3109.313 | — | 25.000 | 1.71230 |
| 9 | −248.193 | — | 11.105 | — |
| 10 | −188.935 | — | 10.000 | 1.60910 |
| 11 | −2089.608 | — | 265.863 | — |

FIGS. 21A, 21B, 22A, and 22B show the various aberrations of the scanning optical system with the arrangement of the eighth embodiment. FIG. 21A shows the linearity error, FIG. 21B shows the curvature of field, FIG. 22A shows the percentage change of the f-number, and FIG. 22B shows the curving of a scanning line displaced by 0.12 mm from the optical axis in the subscanning direction. The axes and indication lines of FIGS. 21A, 21B, 22A, and 22B represent the same aberrations as those previously discussed in the third embodiment.

The values for the above mentioned conditions (1) −4.0 <f4/f<−0.8, (2) −2.0<f4/f<−0.8, and (3) −3.0<f1z/f2z<−1.5 for the first through eighth embodiments are as shown in Table 9.

TABLE 9

| EMBODIMENT | CONDITIONS (1) or (2) f4/f | CONDITION (3) f1z/f2z |
|---|---|---|
| FIRST | −1.357 | — |
| SECOND | −1.577 | — |
| THIRD | −1.136 | −1.951 |
| FOURTH | −1.189 | −1.934 |
| FIFTH | −1.750 | −2.045 |
| SIXTH | −0.916 | −1.907 |
| SEVENTH | −1.570 | −2.984 |
| EIGHTH | −1.141 | −1.510 |

Condition (1) can be satisfied with the use of a fourth lens as described, and conditions (2) and (3) can be simultaneously satisfied with the combination of the second, third, and fourth lenses as described.

As previously described by satisfying the condition (1), the curvature of field in the subscanning direction is kept low, while linearity error (fθ characteristic) is satisfactorily corrected. As shown in FIGS. 2A, 4A, 6A, 9A, 12A, 15A, 18A, and 21A, representing the first through eighth embodiments respectively, each of the embodiments described has a low linearity error. Furthermore as shown by FIGS. 2B, 4B, 6B, 9B, 12B, 15B, 18B, and 21B, the low linearity error is achieved at the same time as a low field curvature in both the main scanning and subscanning directions across a scanning width of approximately ±160 mm. The scanning width of ±160 mm is enough to image an A3 size page.

Accordingly, the spot may be kept within the focal depth even when the focal depth is made shallow by making the numerical aperture NA large, as the curvature of field is small with the fθ lens 5 of the embodiments. The numerical aperture NA can thus be increased, in order to reduce the spot size and improve the image density. Thus, imaging is possible at a higher density and definition than with a conventional scanning lens. To be more specific, a resolution of approximately 1200 dpi can be obtained for an A3-width imaging surface.

Condition (2) restricts the range of condition (1) by raising the lower limit. Condition (2) corrects the curvature of field in the subscanning direction and the error in linearity (fθ characteristic) more favorably than condition (1).

Each of the third through eighth embodiments satisfies condition (2). The benefit of satisfying condition (2) is the same as that described for condition (1), but since the requirement is more strict, the benefit is more pronounced. Particularly, satisfying condition (2) is beneficial with a multi-beam system, in that each of the multiple scanning beams is very well corrected.

As described above, the Present invention presents a scanning lens which can keeps the linearity error at a low level while having a low astigmatism, and keeping the curvatures of field in the main scanning and subscanning directions at low levels. These reductions in aberrations are possible over a wide scanning range of ±160 mm, allowing the imaging of at least an A3 size sheet. Thus by using the scanning lens of the present invention, the image density of the scanning optical system may be improved to enable drawings of higher definition.

Still further, condition (3) restricts the curving, in the subscanning direction, of scanning lines displaced from the optical axis in the subscanning direction. Each of the third through eighth embodiments satisfied condition (3). In the case of a multi-beam scanning optical system, a plurality of laser beams, the optical axes which are separated in the subscanning direction, are made incident on cylindrical lens 1 by the use of a multi-point emission semiconductor laser or by synthesizing the light beam from a plurality of semiconductor lasers using a prism, mirror, etc. The beams may be interlaced or overlapped to some degree. As shown by FIGS. 7B, 10B, 13B, 16B, 19B, and 22B, since the scanning lines displaced from the optical axis in the subscanning direction have a low amount of curving, the scanning lines along and outside the optical axis can be maintained satisfactorily parallel, enabling accurate imaging even in a multi-beam device.

In addition, as shown by FIGS. 7A, 10A, 13A, 16A, 19A, and 22A, by satisfying condition (3), the percentage change of the f-number can be held relatively low with the third through eighth embodiments, the beam diameter on the imaging surface 4 can be maintained constant regardless of the image height.

Yet still further, each of the third through eighth embodiments satisfies both of conditions (2) and (3), making the third through eight embodiments particularly suited for use in a multi-beam device.

Thus, as described above, the present invention corrects aberrations, particularly curving of a scanning line, of one or of a plurality of scanning lines along, or displaced from, the optical axis of the scanning lens. These reductions in aberrations are possible over a wide scanning range, allowing the imaging of at least an A3 size sheet. Accordingly, imaging speed may be increased with the use of a multi-beam scanning systems using the scanning lens of the present invention.

The present disclosure relates to subject matter contained in Japanese Patent Application Nos. HEI 06-334362, filed on Dec. 16, 1994, and HEI 07-113595, filed on Apr. 14, 1995, which are expressly incorporated herein by reference in their entireties.

What is claimed is:

1. A scanning lens for imaging light beams, deflected in a main scanning direction by a deflector, onto a scanned surface, said scanning lens comprising, in order from said deflector toward said scanned surface:

a first lens having a negative power in at least said main scanning direction, a scanned surface side of said first lens comprising a cylindrical surface having negative power in a subscanning direction;

a second lens having a positive power in at least said main scanning direction;

a third lens having a positive power in at least said main scanning direction; and a fourth lens having a negative power in at least said main scanning direction.

2. The scanning lens according to claim 1, said first lens having a negative power in said subscanning direction, said second lens having a positive power in said subscanning direction, said third lens having a positive power in said subscanning direction, and said fourth lens having a negative power in said subscanning direction.

3. The scanning lens according to claim 1, a scanned surface side of said third lens comprising a positive toric surface generated about an axis of rotation in said subscanning direction and having a positive power in said subscanning direction greater than said power in said main scanning direction.

4. The scanning lens according to claim 3, said second lens comprising a biconvex lens with both convex surfaces being spherical surfaces, said third lens comprising a plano-convex toric lens with a deflector side surface being a planar surface, and said fourth lens comprising a rotationally symmetric lens with a deflector side surface providing the negative power.

5. The scanning lens according to claim 1, wherein said scanning lens satisfies the condition:

$$-4.0 < f4/f < -0.8,$$

wherein f4 designates a focal length in said main scanning direction of said fourth lens, and f designates a focal length in said main scanning direction of said scanning lens.

6. The scanning lens according to claim 1, a scanned surface side of said second lens comprising a positive toric surface generated about an axis of rotation in said subscanning direction and having a positive power in said subscanning direction greater than said power in said main scanning direction.

7. The scanning lens according to claim 6, wherein said scanning lens satisfies the condition:

$$-3.0 < f1z/f2z < -1.5,$$

wherein f1z designates a focal length in said subscanning direction of said first lens, and f2z designates a focal length in said subscanning direction of said second lens.

8. The scanning lens according to claim 6, wherein said scanning lens satisfies the condition:

$$-2.0 < f4/f < -0.8,$$

wherein f4 designates a focal length in said main scanning direction of said fourth lens and f designates a focal length in said main scanning direction of said scanning lens.

9. The scanning lens according to claim 8, wherein said scanning lens satisfies the condition:

$$-3.0 < f1z/f2z < -1.5,$$

wherein f1z designates a focal length in said subscanning direction of said first lens, and f2z designates a focal length in said subscanning direction of said second lens.

10. A scanning lens according to claim 6, said third lens comprising a plano-convex lens having a planar surface on a deflector side and having a spherical surface on a scanned side, and said fourth lens comprising a rotationally symmetric lens having a negative power provided by a deflector side surface.

11. The scanning lens according to claim 10, wherein said scanning lens satisfies the condition:

$$-3.0 < f1z/f2z < -1.5,$$

wherein f1z designates a focal length in said subscanning direction of said first lens, and f2z designates a focal length in said subscanning direction of said second lens.

12. The scanning lens according to claim 10, wherein said scanning lens satisfies the condition:

$$-2.0 < f4/f < -0.8,$$

wherein f4 designates a focal length in said main scanning direction of said fourth lens and f designates a focal length in said main scanning direction of said scanning lens.

13. The scanning lens according to claim 12, wherein said scanning lens satisfies the condition:

$$-3.0 < f1z/f2z < -1.5,$$

wherein f1z designates a focal length in said subscanning direction of said first lens, and f2z designates a focal length in said subscanning direction of said second lens.

14. The scanning lens according to claim 6, a deflector side surface of said second lens comprising a convex spherical surface.

15. A scanning lens for imaging light beams, deflected in a main scanning direction by a deflector, onto a scanned surface, said scanning lens comprising, in order from said deflector toward said scanned surface:

a first lens having a negative power in at least said main scanning direction, said first lens having a negative power in a subscanning direction, the power of said first lens in the subscanning direction being more negative than the power of said first lens in the main scanning direction;

a second lens having a positive power in at least said main scanning direction;

a third lens having a positive power in at least said main scanning direction; and a fourth lens having a negative power in at least said main scanning direction.

16. The scanning lens according to claim 15, a scanned surface side of said first lens comprising a cylindrical surface having negative power in said subscanning direction.

17. The scanning lens according to claim 16,
a scanned surface side of said third lens comprising a positive toric surface generated about an axis of rotation in said subscanning direction and having a positive power in said subscanning direction greater than a power of said third lens in said main scanning direction.

18. The scanning lens according to claim 17,
said second lens comprising a biconvex lens with both convex surfaces being spherical surfaces, said third lens comprising a plano-convex toric lens with a deflector side surface being a planar surface, and said fourth lens comprising a rotationally symmetric lens with a deflector side surface providing the negative power.

19. The scanning lens according to claim 16,
a scanned surface side of said second lens comprising a positive toric surface generated about an axis of rotation in said subscanning direction and having a positive power in said subscanning direction greater than a power in said main scanning direction.

20. The scanning lens according to claim 19,
wherein said scanning lens satisfies the condition:

$$-3.0 < f_{1z}/f_{2z} < -1.5,$$

wherein $f_{1z}$ designates a focal length of said first lens in said subscanning direction, and $f_{2z}$ designates a focal length of said second lens in said subscanning direction.

21. The scanning lens according to claim 19,
wherein said scanning lens satisfies the condition:

$$-2.0 < f_4/f < -0.8,$$

wherein $f_4$ designates a focal length of said fourth lens in said main scanning direction, and $f$ designates a focal length of said scanning lens in said main scanning direction.

22. The scanning lens according to claim 21,
wherein said scanning lens satisfies the condition:

$$-3.0 < f_{1z}/f_{2z} < -1.5,$$

wherein $f_{1z}$ designates a focal length of said first lens in said subscanning direction, and $f_{2z}$ designates a focal length of said second lens in said subscanning direction.

23. A scanning lens according to claim 19,
said third lens comprising a plano-convex lens having a planar surface on a deflector side and having a spherical surface on a scanned side, and
said fourth lens comprising a rotationally symmetric lens having a negative power provided by a deflector side surface.

24. The scanning lens according to claim 23,
wherein said scanning lens satisfies the condition:

$$-3.0 < f_{1z}/f_{2z} < -1.5,$$

wherein $f_{1z}$ designates a focal length of said first lens in said subscanning direction, and $f_{2z}$ designates a focal length of said second lens in said subscanning direction.

25. The scanning lens according to claim 23,
wherein said scanning lens satisfies the condition:

$$-2.0 < f_4/f < -0.8,$$

wherein $f_4$ designates a focal length of said fourth lens in said main scanning direction, and $f$ designates a focal length of said scanning lens in said main scanning direction.

26. The scanning lens according to claim 25,
wherein said scanning lens satisfies the condition:

$$-3.0 < f_{1z}/f_{2z} < -1.5,$$

wherein $f_{1z}$ designates a focal length of said first lens in said subscanning direction, and $f_{2z}$ designates a focal length of said second lens in said subscanning direction.

27. The scanning lens according to claim 19,
a deflector side surface of said second lens comprising a convex spherical surface.

28. The scanning lens according to claim 15, wherein said scanning lens satisfies the condition:

$$-4.0 < f_4/f < -0.8,$$

wherein $f_4$ designates a focal length of said fourth lens in said main scanning direction, and $f$ designates a focal length of said scanning lens in said main scanning direction.

29. A scanning lens for imaging light beams, deflected in a main scanning direction by a deflector, onto a scanned surface, said scanning lens comprising, in order from said deflector toward said scanned surface:
a first lens having a negative power in at least said main scanning direction;
a second lens having a positive power in at least said main scanning direction, said second lens having a positive power in a subscanning direction, the power of said second lens in said subscanning direction being greater than the power of said second lens in the main scanning direction;
a third lens having a positive power in at least said main scanning direction; and
a fourth lens having a negative power in at least said main scanning direction.

30. The scanning lens according to claim 29,
a scanned surface side of said second lens comprising a positive toric surface generated about an axis of rotation in said subscanning direction and having a positive power in said subscanning direction greater than a power in said main scanning direction.

31. The scanning lens according to claim 30,
wherein said scanning lens satisfies the condition:

$$-3.0 < f_{1z}/f_{2z} < -1.5,$$

wherein $f_{1z}$ designates a focal length of said first lens in said subscanning direction, and $f_{2z}$ designates a focal length of said second lens in said subscanning direction.

32. The scanning lens according to claim 30,
wherein said scanning lens satisfies the condition:

$$-2.0 < f_4/f < -0.8,$$

wherein $f_4$ designates a focal length of said fourth lens in said main scanning direction, and $f$ designates a focal length of said scanning lens in said main scanning direction.

33. The scanning lens according to claim 32, wherein said scanning lens satisfies the condition:

$$-3.0 < f1z/f2z < -1.5,$$

wherein f1z designates a focal length of said first lens in said subscanning direction, and f2z designates a focal length of said second lens in said subscanning direction.

34. The scanning lens according to claim 30, a deflector side surface of said second lens comprising a convex spherical surface.

35. A scanning lens for imaging light beams, deflected in a main scanning direction by a deflector, onto a scanned surface, said scanning lens comprising, in order from said deflector toward said scanned surface:

a first lens having a negative power in at least said main scanning direction;

a second lens having a positive power in at least said main scanning direction;

a third lens having a positive power in at least said main scanning direction, said third lens having a positive power in a subscanning direction, the power of said third lens in the subscanning direction being greater than the power of said third lens in said main scanning direction; and a fourth lens having a negative power in at least said main scanning direction.

36. The scanning lens according to claim 35, a scanned surface side of said third lens comprising a positive toric surface generated about an axis of rotation in said subscanning direction and having a positive power in said subscanning direction greater than a power of said third lens in a main scanning direction.

37. The scanning lens according to claim 36, said second lens comprising a biconvex lens with both convex surfaces being spherical surfaces, said third lens comprising a plano-convex toric lens with a deflector side surface being a planar surface, and said fourth lens comprising a rotationally symmetric lens with a deflector side surface providing the negative power.

* * * * *